US008189212B2

(12) United States Patent  
Uchida et al.

(10) Patent No.: US 8,189,212 B2  
(45) Date of Patent: May 29, 2012

(54) PRINTING CONTROL BASED ON A SELECTED PRINTING MODE BY A USER

(75) Inventors: Tatsuro Uchida, Kanagawa (JP); Masanori Aritomi, Tokyo (JP); Yasuhiro Kujirai, Tokyo (JP); Hiroshi Oomura, Kanagawa (JP); Yoshihiro Takagi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/191,378

(22) Filed: Jul. 26, 2011

(65) Prior Publication Data

US 2011/0279838 A1 Nov. 17, 2011

Related U.S. Application Data

(62) Division of application No. 13/075,111, filed on Mar. 29, 2011, now Pat. No. 8,009,304, which is a division of application No. 12/276,283, filed on Nov. 21, 2008, now Pat. No. 7,940,403, which is a division of application No. 11/361,980, filed on Feb. 27, 2006, now Pat. No. 7,474,439, which is a division of application No. 10/999,993, filed on Dec. 1, 2004, now Pat. No. 7,131,775.

(30) Foreign Application Priority Data

| Dec. 9, 2003 | (JP) | 2003-411060 |
| Nov. 5, 2004 | (JP) | 2004-322750 |

(51) Int. Cl.  
*G06F 15/00* (2006.01)  
*G06F 3/12* (2006.01)  
*G06K 1/00* (2006.01)

(52) U.S. Cl. ...................................... 358/1.13; 358/1.14

(58) Field of Classification Search ........................ None  
See application file for complete search history.

(56) References Cited

U.S. PATENT DOCUMENTS 5,297,815 A 3/1994 Anderson et al.  
(Continued)

FOREIGN PATENT DOCUMENTS

JP 7226817 8/1995  
(Continued)

OTHER PUBLICATIONS

Official Notice of Rejection from Corresponding Japanese Application No. 2010-030370, dated Mar. 12, 2010 with English Translation, pp. 1-9.

*Primary Examiner* — Douglas Tran  
(74) *Attorney, Agent, or Firm* — Fitzpatrick, Cella, Harper & Scinto

(57) ABSTRACT

A printing control apparatus is provided which can produce an appropriate copy-forgery-inhibited pattern image by adding a monochrome copy-forgery-inhibited pattern even if monochrome mode printing is performed in the condition in which a color copy-forgery-inhibited pattern is set. When the monochrome mode printing is performed in the condition in which the color copy-forgery-inhibited pattern is set, and if the copy-forgery-inhibited pattern color is output with its color unchanged, the color is not converted into 100% black. Considering this, when a forced monochrome mode is selected, even if the user's setting for the copy-forgery-inhibited pattern is color, the color is changed to monochrome (black) before output. If the designated copy-forgery-inhibited pattern setting is for color, the designated copy-forgery-inhibited pattern setting is changed to the monochrome copy-forgery-inhibited pattern setting so that the printing processing is performed in the monochrome mode using the designated copy-forgery-inhibited pattern setting.

10 Claims, 25 Drawing Sheets

U.S. PATENT DOCUMENTS

| | | |
|---|---|---|
| 5,788,285 A | 8/1998 | Wicker |
| 6,000,728 A | 12/1999 | Mowry, Jr. |
| 6,130,947 A | 10/2000 | Mizobe et al. |
| 6,139,066 A | 10/2000 | Mowry et al. |
| 6,161,869 A | 12/2000 | Mowry et al. |
| 6,305,718 B1 | 10/2001 | Kendrick |
| 6,343,745 B1 | 2/2002 | Bohm et al. |
| 6,369,919 B1 | 4/2002 | Drinkwater et al. |
| 6,538,757 B1 | 3/2003 | Sansone |
| 6,692,030 B1 | 2/2004 | Phillips |
| 6,729,655 B1 | 5/2004 | Dorricott et al. |
| 6,752,430 B2 | 6/2004 | Holt et al. |
| 6,817,289 B1 | 11/2004 | Liebenow |
| 6,865,001 B2 | 3/2005 | Long et al. |
| 7,301,654 B2 | 11/2007 | Matsunoshita et al. |
| 7,365,865 B2 | 4/2008 | Kidani et al. |
| 7,920,817 B2 | 4/2011 | Oomura et al. |
| 2002/0054317 A1 | 5/2002 | Matsunoshita et al. |
| 2002/0185857 A1 | 12/2002 | Taylor et al. |
| 2003/0193184 A1 | 10/2003 | Taylor et al. |
| 2004/0150859 A1 | 8/2004 | Hayashi |
| 2004/0263912 A1 | 12/2004 | Weng |
| 2005/0052705 A1 | 3/2005 | Hersch et al. |
| 2005/0058476 A1 | 3/2005 | Murakami |
| 2005/0078974 A1 | 4/2005 | Uchida et al. |
| 2005/0088701 A1 | 4/2005 | Uchida et al. |
| 2005/0190411 A1 | 9/2005 | Ohno |
| 2005/0219634 A1 | 10/2005 | Murakami |
| 2005/0248813 A1 | 11/2005 | Zolla et al. |

FOREIGN PATENT DOCUMENTS

| | | |
|---|---|---|
| JP | 11-150649 | 6/1999 |
| JP | 2001197297 | 7/2001 |
| JP | 2001238075 | 8/2001 |
| JP | 2001-324898 | 11/2001 |
| JP | 2001346034 | 12/2001 |
| JP | 2002077571 | 3/2002 |
| JP | 2002-140178 | 5/2002 |
| JP | 2003-271367 | 9/2003 |
| JP | 2006-185457 A | 7/2006 |
| JP | 2010-027068 A | 2/2010 |

VISUALIZATION

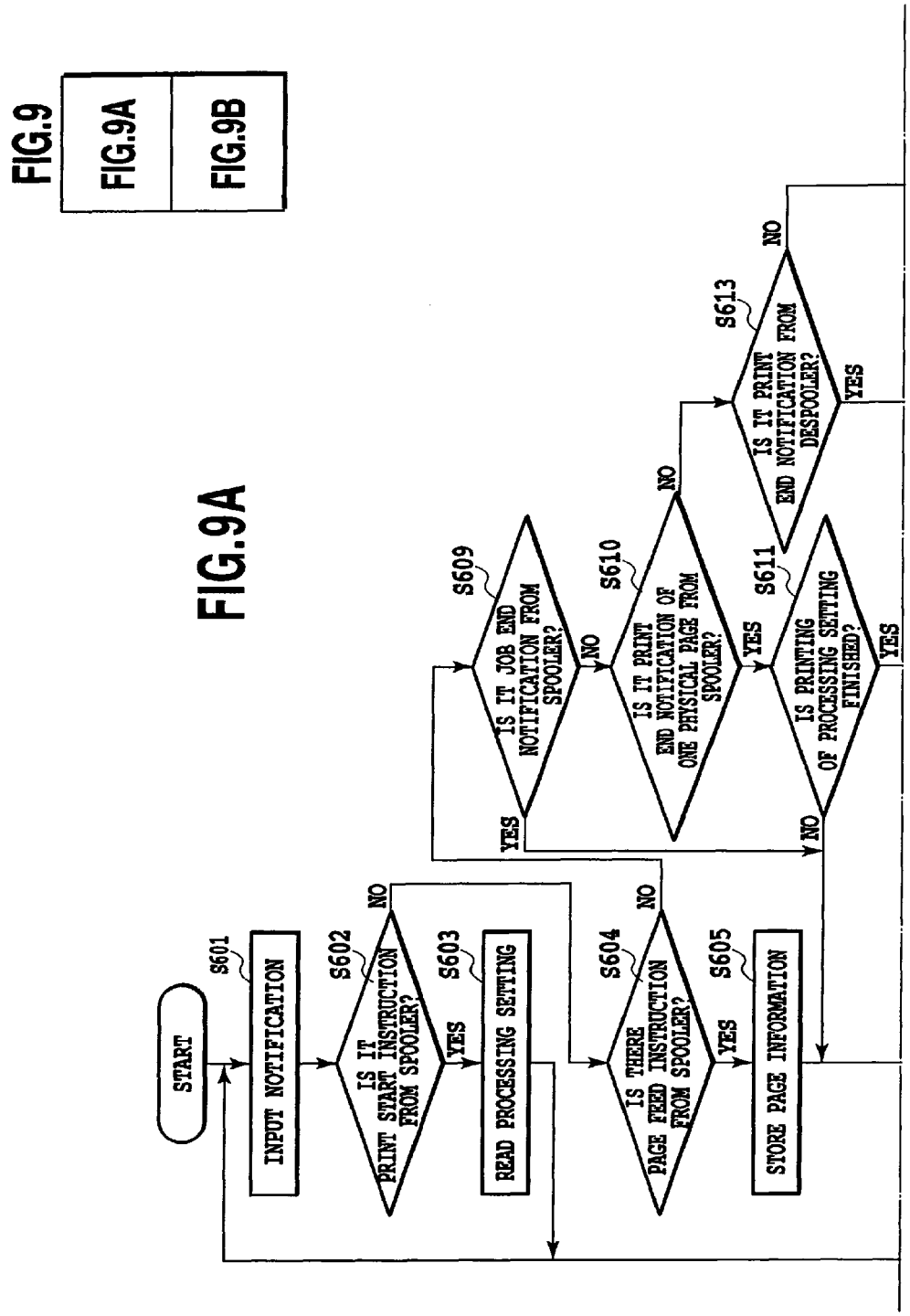

PRINTING CONTROL BASED ON A SELECTED PRINTING MODE BY A USER

This application is a divisional of U.S. application Ser. No. 13/075,111, filed Mar. 29, 2011, now allowed, which is a divisional of application Ser. No. 12/276,283, filed Nov. 21, 2008, now U.S. Pat. No. 7,940,403, which is a divisional of application Ser. No. 11/361,980, filed Feb. 27, 2006, now U.S. Pat. No. 7,474,439, which is a divisional of application Ser. No. 10/999,993, filed Dec. 1, 2004, now U.S. Pat. No. 7,131,775, the contents of each of which are incorporated by reference herein.

BACKGROUND OF THE INVENTION

1. Field of the Invention

The present invention relates to a printing control apparatus and a printing control method, and more particularly to a printing processing of an image including a copy-forgery-inhibited pattern image for checking the usage of a copying material in a system configured to include an information processing unit such as a personal computer and a printing apparatus such as a printer.

2. Description of the Related Art

Conventionally, in order to prohibit copying a ledger sheet, a resident card, and the like, or restrain people from doing so, papers on which special printing is given, papers called anti-counterfeit paper have been used. The anti-counterfeit paper is a paper in which characters or the like such as "COPY" is embedded to be hard to recognized by a human eye when the paper is in a state of an original and to show up on the copied paper when the original is copied using a copying machine or the like. Thereby, people can visually distinguish a print sheet as the original from the duplicate made by copying the original, easily. The use of this anti-counterfeit paper as an original causes those who copy the original to hesitate to use duplicated papers. Moreover, the anti-counterfeit paper gives a mental restraint effect of inhibiting an act of copying itself. The reason why characters in the original of the anti-counterfeit paper needs to be hard for people to recognize is to enable people to distinguish between the original and the duplicate definitely. If characters such as "COPY" is recognizable to such an extent that people can clearly recognize it even in the original, there may occur the possibility that people recognize it as the duplicate and such paper does not make a sense as the anti-counterfeit paper. Wicker (U.S. Pat. No. 5,788,285) and Mowry et al. (U.S. Pat. No. 6,000,728) disclose arts for manufacturing such an anti-counterfeiting paper.

However, since the anti-counterfeit paper like this is made by fully employing a special printing technology, it comes with a problem of high cost compared to normal papers. Moreover, the anti-counterfeit paper can make only characters that are set at the time of manufacturing show up. Therefore, an application of the anti-counterfeit paper and characters being set are limited. That is, the conventional anti-counterfeit paper lacks flexibility regarding applications because of a matter on its manufacture.

On the other hand, as various contents are being digitized, the contents of ledger sheets, a resident card, or the like are being transformed into digital data similarly. However, digitization for handling of these ledger sheets and resident cards, such as use of these documents, is still in a transition phase. Consequently, the contents of digital data formed using a computer is likely to be outputted on papers with a printer or the like for subsequent use.

Under such circumstances, significant improvement in printer performance has been achieved in recent years, and this is one of cause for a technology, which makes it possible to print out a paper on demand that has the same effect as the conventional anti-counterfeit paper using a computer and a printer, to attract an attention. Japanese Patent Application Laid-open No. 2001-197297 and Japanese Patent Application Laid-open No. 2001-238075 disclose technologies whereby, when contests data formed using a computer is printed out with a printer, an image called copy-forgery-inhibited pattern image (a copy-forgery-inhibited pattern) is also outputted with superposed on the background of the contents data. The copy-forgery-inhibited pattern image is an image that is recognized only as a simple pattern or a mere background color in the original (a printed matter outputted by a printer) to the human eye, but, when it is copied, will show up as predetermined characters or the like in the duplicate. Thereby, the same restraint effect as the anti-counterfeit paper can be given to those who copied.

In the case that the contents are printed out together with a copy-forgery-inhibited pattern image generated by a computer, being superposed thereon, naturally a normal printing paper or the like can be used. Therefore, this technology has an advantage in terms of cost in comparison with the technology using the anti-counterfeit paper. Moreover, the copy-forgery-inhibited pattern image can be generated when the contents are outputted by printing. Thereby, characters or the like that will be made visible at the time of copying can be set freely. Further more, there is also an advantage that dynamic information, such as a user name who executed printing and printout time and date, can be made to show up as the characters.

The copy-forgery-inhibited pattern image, as discussed above, is one that, when being duplicated, visualizes a predetermined character or the like that could not be recognized before duplication, therefore restrains people from using the duplicate, and realizes an effect of enabling people to visually identify what the people sees to be the duplicate, in other words, not to be the original easily. In order to realize this effect, the copy-forgery-inhibited pattern image is basically composed of two areas: an area which remains (shows up) in the duplicate when being copied, and an area which disappears in the duplicate or becomes too light-colored to recognize compared to the image remaining area. These two areas, as being printed, are of almost the same density, and therefore no one can recognize that characters etc., such as "COPY" that will become visible by duplication are hidden (embedded) therein at first sight, in a macroscopic sense. However, in a microscopic sense, for example, in a level of printed dots, these two areas have different characteristics, respectively, as will be shown below.

Hereafter, an image that will show up by duplication is called a "latent image" and an image that will disappear or become light-colored is called a "background" for convenience. The copy-forgery-inhibited pattern image is basically composed of the latent image and the background image. Incidentally, there may be a case where the latent image is called a foreground as a term related to a user interface.

In addition, copy-forgery-inhibited pattern may be, called tint block.

Note that tint block printing is not limited to the above-mentioned composition, and the copy-forgery-inhibited pattern image may be composed in such a way that characters, such as a "COPY", a logo, or a pattern will be rendered (will become visible) as an recognizable image to the human eye in the duplicate. That is, even if the characters "COPY" are rendered as outlined characters in the duplicate, it will achieve its object as tint block printing. In this case, needless to say, the characters of "COPY" are generated as a background image.

Now, in the case of dot printers, such as of electro-photographic and ink jet systems, an area which will remain in the duplicate (latent image section or foreground section) consists of sets of concentrated dot masses. The area which will disappear or be reproduced with thinner density (background section) than the image density in the area which will remain consists of sets of dispersed dots. Moreover, in a state where the copy-forgery-inhibited pattern image is printed, the density of the whole copy-forgery-inhibited pattern image can be made almost uniform by setting the images in such a way as to have almost equal density in respective areas.

FIG. 1 is a view showing these two areas. As shown in this figure, the copy-forgery-inhibited pattern image is composed of both the background section in which dots are arranged dispersedly and the latent image section in which concentrated dot masses are arranged. These two areas can be generated by mutually different half tone dot processing and dither processing. In the case where the copy-forgery-inhibited pattern image is generated using the half tone dot processing, half tone dot processing with a small number of lines is suited for the latent image and that with a large number of lines is suited for the background section. In the case where the copy-forgery-inhibited pattern image is generated using dither processing, dither processing using a dot concentration type dither matrix is suitable for the latent image section, and dither processing using a dot dispersion type dither matrix is suitable for the background section.

The copying machine generally has critical points in reproducing capability that depends on input resolution of reading fine dots of a manuscript and output resolution of reproducing fine dots. In the case where the dot in the background section of the copy-forgery-inhibited pattern image is formed smaller than the critical point of dots that the copying machine can reproduce and the dot masses in the latent image section thereof are formed larger than the critical point, an image composed of larger dot masses of the copy-forgery-inhibited pattern image is reproduced and an image composed of smaller dots is not reproduced, in the duplicate by copying. As a result, the latent image will be made visible. Moreover, even in the case where dispersed small dots are not completely disappeared by copying, i.e., in the case where the density of the background section is low compared to that of concentrated dot masses, relatively the latent image can be recognized more markedly.

FIGS. 2A and 2B are views showing visualization of a latent image. FIG. 2A is a view corresponding to a state where the copy-forgery-inhibited pattern image is printed. FIG. 2B is view corresponding to a duplicate obtained when FIG. 2A was copied by a copying machine. From FIG. 2A and FIG. 2B, it may be understood that the latent image by the concentrated dot masses will show up and the background by the dispersed dots will disappear.

Generally, a color printer has a plurality of color processing modes such as a full-color printing mode and a black-and-white printing mode. In recent years, however, it has become a common practice to employ a color processing mode automatic switching function for cost reduction such as toner savings. The color processing mode automatic switching function carries out such processing as printing a page in the black-and-white mode even when the full-color printing is designated, if the page to be printed consists of only black-and-white data. The function is disclosed in Japanese Patent Application Laid-open No. 5-019993 (1993), for example. In addition, in a printing-time color processing mode, the charge processing for printing job on a page by page basis has been operating.

FIG. 3 shows an example of a user interface of a color processing mode designating method. As illustrated in a menu 5101 of FIG. 3, the present example provides three types of color processing modes: a "full-color/monochrome automatic switching" mode for switching the color mode in accordance with the contents of the output page; a "full-color" mode for always printing in the color mode; and a "monochrome" mode for always printing in the monochrome mode.

As for the method of designating the color mode to the printer, it is common to add a job command as shown below to the initial position of the printing data. Commands for making the automatic, color and monochrome commands to the printer are as follows.

| | |
|---|---|
| JL SET COLOR-MODE = | AUTO |
| JL SET COLOR-MODE = | COLOR |
| JL SET COLOR-MODE = | MONOCHROME |

In the tint block (a copy-forgery-inhibited pattern) printing, however, when the monochrome mode printing is carried out under such conditions as the color tint block is set, and if the tint block color is output as it is, the device or driver performs the color/monochrome conversion. In this case, a copy-forgery-inhibited pattern image may be converted to image data which represents black impromptu by mixing cyan, magenta, yellow and the like with desired ratio rather than using only black ink or toner. Also, even when using black ink and toner, a copy-forgery-inhibited pattern image may not be converted to a optimized concentration as a monochrome copy-forgery-inhibited pattern image. Thus, the copy-forgery-inhibited pattern image cannot become the desired image and thickness because of the effect of dither process and the like, thereby resulting in an image that cannot make the full effect of the tint block printing.

SUMMARY OF THE INVENTION

An object of the present invention to provide an appropriate copy-forgery-inhibited pattern image by adding a monochrome tint block even if the monochrome mode printing is carried out under the conditions in which the color tint block is set.

According to the present invention, there is provided a printing control apparatus that generates printing data of a manuscript image including a copy-forgery-inhibited pattern image, and transmits the printing data to a printing apparatus communicably connected to the printing control apparatus, the printing control apparatus comprising: color processing mode decision means for deciding a color processing mode of color/monochrome for each output page included in the manuscript image; tint block setting selecting means for selecting settings for applying to the output page a tint block color suitable for the color processing mode decided by the color processing mode decision means; and generating means for generating printing data for carrying out printing in the color processing mode decided by the color processing mode decision means by applying the settings selected by the tint block setting selecting means to the output page.

According to the present invention, even if the monochrome mode printing is carried out in the conditions in which the color tint block is set, an appropriate copy-forgery-inhibited pattern image can be obtained.

The above and other objects, effects, features and advantages of the present invention will become more apparent from the following description of embodiments thereof taken in conjunction with the accompanying drawings.

BRIEF DESCRIPTION OF THE DRAWINGS

FIG. 9 is a view showing a relationship between FIG. 9A and FIG. 9B;

FIGS. 9A and 9B are flowcharts illustrating an example of printing control and decision processing of a physical page number by a spool file manager;

DETAILED DESCRIPTION OF PREFERRED EMBODIMENTS

Hereafter embodiments of the present invention will be described in detail with reference to the drawings.

FIG. 4 through FIG. 24 are views explaining configurations related to print processing and generation of basic drawing data of the copy-forgery-inhibited pattern image (the copy-forgery-inhibited pattern) accompanying it in a system comprising a host computer that is information processing apparatus and a printer that is printing equipment, according to one embodiment of the present invention.

Note that, in this embodiment, part that will become visible in the duplicate at the time of copying is called a latent image section or a foreground section. Part that will disappear or become light-colored compared to the latent image section in the duplicate at the time of copying is called a background section. And text information, such as "COPY" and "VOID", is included in the latent image section. However, a copy-forgery-inhibited pattern image according to the present invention is not limited to them. The text information may be in such a form as is represented (visualized) as outlined characters to a surrounding image in the duplicate. In this case, it is understood that a relationship of concentration and dispersion of dots between the latent image section and the background section will become in inverse relation to a relationship for not-outlined characters. The present invention is not prescribed by the kind of copy-forgery-inhibited pattern image, generating process, color, form, size, etc.

In addition, copy-forgery-inhibited pattern may be called tint block.

Configuration of Printing System

Figure 4:
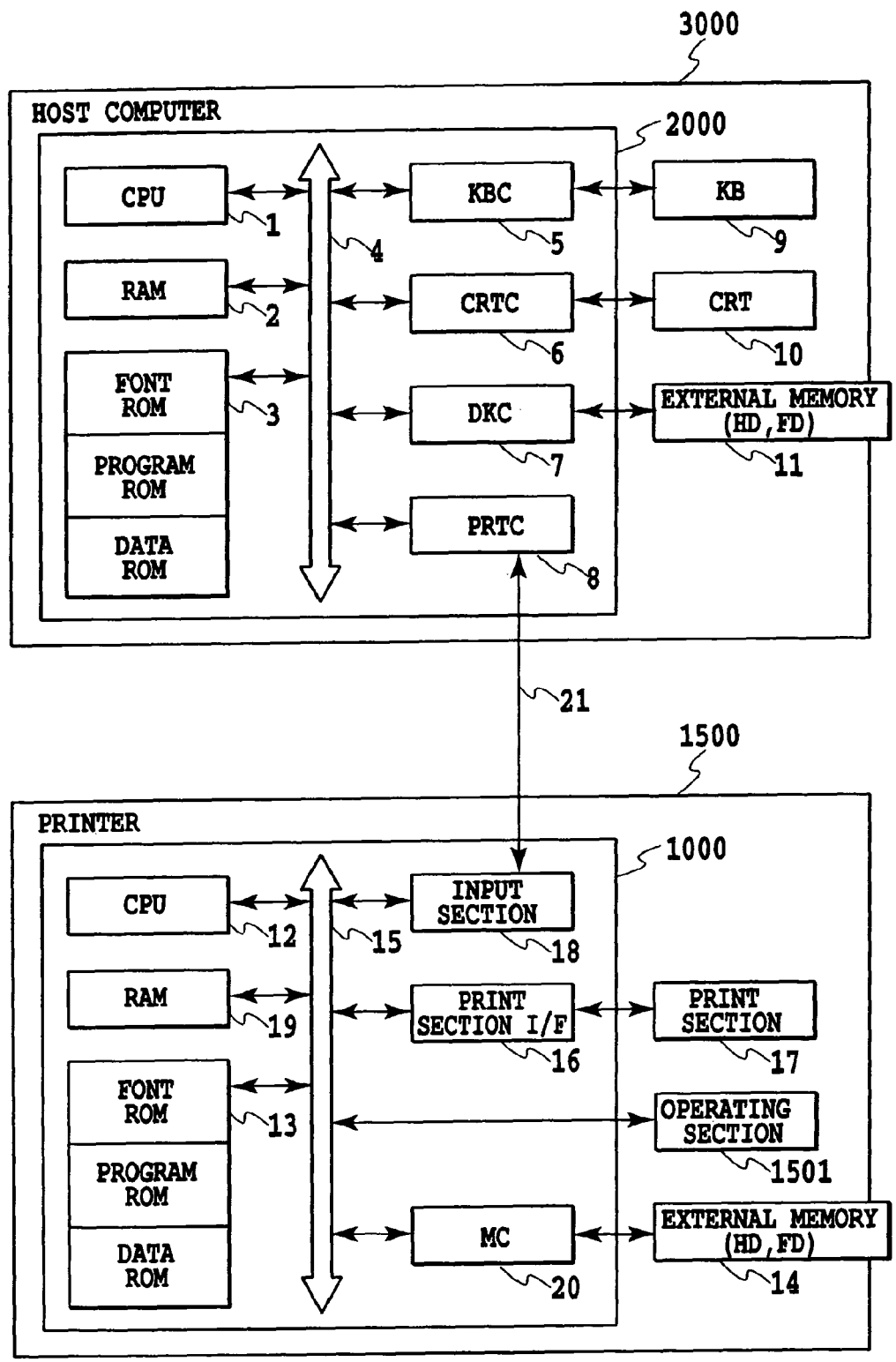
FIG. 4 is a block diagram showing a configuration of a printing system according to one embodiment of the present invention.

FIG. 4 is a block diagram showing a configuration of a printing system according to the embodiment of the present invention. The present invention can be applied to any of a single device, a system comprising a plurality of devices, and a system that is connected to other device/system through a network, such as LAN and WAN, and performs processing, provided that the functions of the present invention are performed.

In this figure, the host computer 3000 is equipped with CPU 1 that controls execution of processing of a document, in which diagrams, images, characters, tables (including table calculation etc.), etc. are mixed, and which includes processing related to embodiments of the present invention that will be described later, according to a document processing program stored in program ROM of ROM 3 or in external memory 11, and execution of the print processing based on the document processing. The CPU 1 supervises controls of devices connected to system bus 4. Program ROM of the ROM 3 or the external memory 11 stores the operating system (hereinafter referred to as OS) that is a control program of the CPU 1 etc. Either font ROM of the ROM 3 or the external memory 11 stores font data used in the document processing etc. Data ROM of the ROM 3 or the external memory 11 stores various data used in performing the document processing etc. RAM 2 functions as main memory, a work area, etc. for the CPU 1.

A keyboard controller (KBC) 5 controls key input from a keyboard 9 and a pointing device (not shown). A CRT controller (CRTC) 6 controls displaying by a CRT display (CRT) 10 including displaying of a copy-forgery-inhibited pattern image. Reference numeral 7 denotes a disk controller (DKC), which controls access to the external memory 11, such as a hard disk (HD) that stores a boot program, various applications, font data, user files, edit files, a printer control command generating program (hereinafter referred to as a printer driver), a floppy (registered trademark) disk (FD), etc. A printer controller (PRTC) 8 is connected to a printer 1500 through a bi-directional interface (interface) 21 to execute control processing of communication with the printer 1500.

The CPU 1 performs, for example, a process of spreading (rasterization) outline fonts onto display information RAM being set on the RAM 2, which enables WYSIWYG on the CRT 10. Moreover, the CPU 1 opens various windows previously registered in response to a command directed by an unillustrated mouse cursor etc. on the CRT 10 and performs various data processing. When performing printing, the user can open a window for printing setting and set a print processing method for the printer driver including setting of a printer and selection of a print mode.

A printer 1500 is controlled by a CPU 12 installed in the printer 1500. According to the control program and the like stored in a program ROM of a ROM 13 or in an external memory 14, the printer CPU 12 outputs an image signal to a printing section (printer engine) 17 connected to a system bus 15 via a printing section I/F 16 as printing output information. The program ROM in the ROM 13 stores the control program and the like of the CPU 12. The font ROM in the ROM 13 stores the font data and the like used for generating the printing output information. Unless the printer includes the external memory 14 such as a hard disk, the data ROM in the ROM 13 stores information and the like used on the host computer.

The CPU 12 can carry out communication processing with the host computer via an input section 18, and notify the host computer 3000 of the information and the like within the printer. A RAM 19, which functions as the main memory and work area of the CPU 12, can be extended in memory capacity by an option RAM connected to an expansion port not shown. The RAM 19 is used as an output information spreading area, an environmental data storing area, an NVRAM and the like. The above mentioned external memory 14 such as a hard disk (HD) and IC card has its access controlled by a memory controller (MC) 20. The external memory 14 is connected optionally for storing the font data, emulation program, form data and the like. An operating panel 1501 has switches and LED displays disposed thereon.

The above-mentioned external memory 14 is not limited to one. Two or more pieces of external memory 14 may be installed and be configured so that an option card in addition to an internal font and an external memory that stores a program for interpreting a printer control language belonging to a different language system can be connected. Moreover, the memory may have NVRAM not shown in the figure and may be configured so as to store printer-mode setting information through the operation panel 1501.

The printing section 17 is equipped with an engine of the electro-photography method in this embodiment. Therefore, the image and accompanying copy-forgery-inhibited pattern image are printed by means of dots of toner that are formed according to their print data. Note that, in applying the present invention, naturally the method of printing is not limited to the electro-photography method like this. For example, the present invention can be applied to printing equipment of any method whereby printing is done by forming dots, such as the ink jet method.

Figure 5:
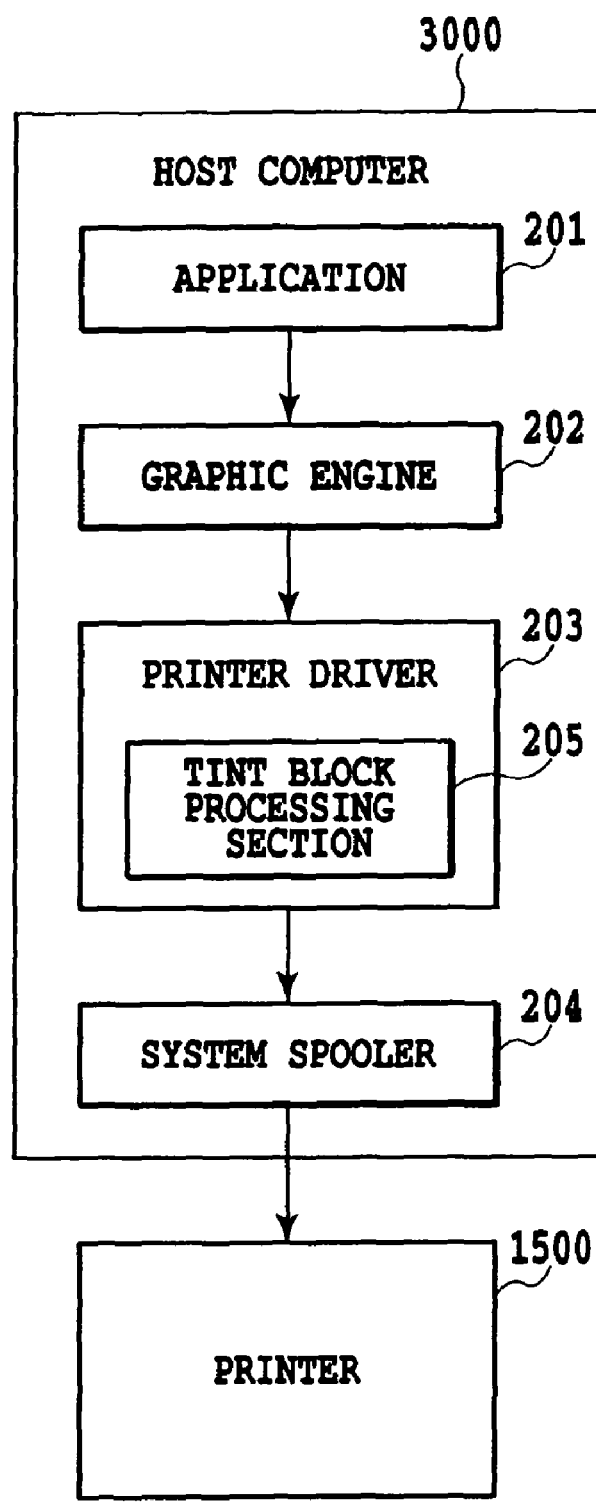
FIG. 5 is a view showing a configuration of an exemplary printing system connected to a printer.

FIG. 5 is a view showing one configuration for print processing in the host computer 3000 shown in FIG. 4. An application 201, a graphic engine 202, a printer driver 203, and a system spooler 204 exist as files stored in the external memory 11, and each of them is a program module that is loaded into the RAM 2 and executed by the OS or a module using the module when being executed. Moreover, the application 201 and the printer driver 203 can be added to an FD of external memory, unillustrated CD-ROM, or an HD of the external memory 11 through an unillustrated network. The application 201 stored in the external memory 11 is loaded into the RAM 2 and executed. When this application 201 makes the printer 1500 execute printing, the application performs outputting (drawing) using the graphic engine 202 that is loaded similarly into the RAM 2 to be executable.

The graphic engine 202 loads similarly the printer driver 203 prepared for each printing apparatus, such as a printer, into the RAM 2 from the external memory 11, and sets the output of the application 201 in the printer driver 203. Then, it converts the GDI (Graphic Device Interface) function received from the application 201 into the DDI (Device Driver Interface) function, and outputs the DDI function to the printer driver 203.

The printer driver 203 converts the output of the application into a control command recognizable to the printer, for example, PDL (Page Description Language), based on the DDI function received from the graphic engine 202. The printing system is configured so that the control command obtained by the conversion goes through the system spooler 204 loaded into the RAM 2 by the "OS," and is outputted to the printer 1500 through an interface 21 as print data.

The printing system according to this embodiment of the present invention has a tint block processing section 205. The tint block processing section 205 pertains to printing a copy-forgery-inhibited pattern image and carries out a process of generating a copy-forgery-inhibited pattern image command, as described later.

Printing-Related Software Module

Figure 6:
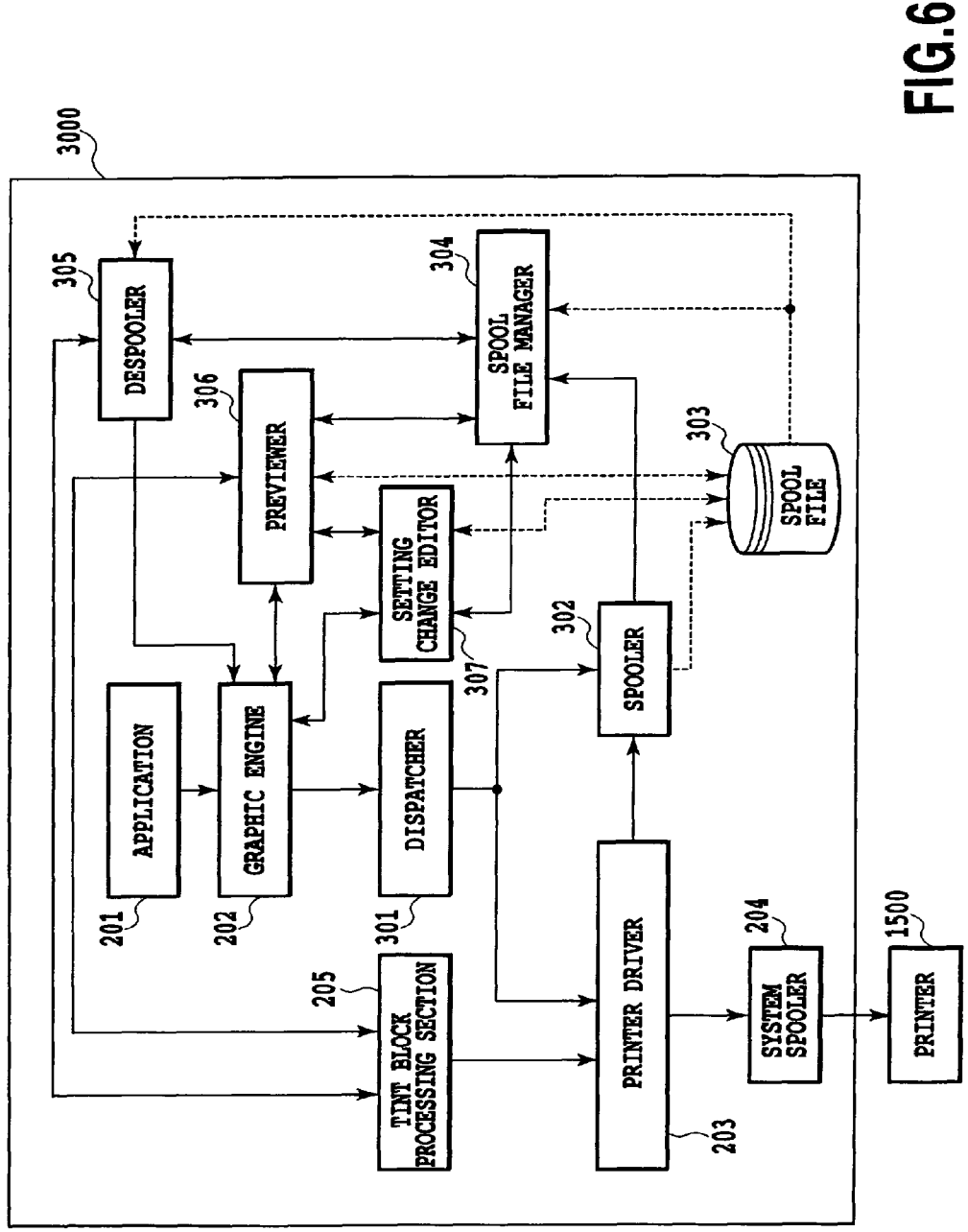
FIG. 6 is a block diagram showing a configuration of a printing system which once spools a print instruction from an application before converting into a printer control command.

FIG. 6 is a block diagram showing a configuration that is an expansion of the configuration shown in FIG. 5, relating to another example of a configuration for print processing in the host computer 3000. This configuration is a configuration in which when a print instruction is sent to the printer driver 203 from the graphic engine 202, a spool file 303 made of an intermediate code is generated temporarily. In the configuration of FIG. 5, the time when the application 201 is released from the print processing is the time when the printer driver 203 has converted all print instructions from the graphic engine 202 into control commands of the printer. In contrast to this, in the configuration of FIG. 6, the time of release is the time when the spooler 302 has converted all the print instructions into intermediate code data, and outputted it to the spool file 303. Usually, the latter finishes in a shorter time. Moreover, the configuration shown in FIG. 6 allows the contents of the spool file 303 to be processed. Thereby, for print data from the application, functions that the application does not possess, such as enlargement, size reduction, printing two or more pages in one page by reducing their sizes, can be realized.

For these purposes, the configuration of FIG. 5 is subjected to system expansion so that spooling is performed with the intermediate code data as shown in FIG. 6. Here, in order to process the print data, normally the user should perform setting through the window presented by the printer driver 203, and the printer driver 203 stores the contents of setting in the RAM 2 or in the external memory 11.

Details of the configuration shown in FIG. 6 will be described below. As shown in this figure, in this expanded processing method, a dispatcher 301 receives the DDI function that is a print instruction from the graphic engine 202. If the print instruction (DDI function) that the dispatcher 301 received from the graphic engine 202 is one that is based on the print instruction (GDI function) that the application 201 issued to the graphic engine 202, the dispatcher 301 loads the spooler 302 stored in the external memory 11 into the RAM 2 and sends the print instruction (DDI function) to the spooler 302, not to the printer driver 203.

The spooler 302 analyses the received print instruction, transforms it into the intermediate code for each of pages, and outputs it to the spool file 303. This spool file of the intermediate code stored in units of page is called a page description file (PDF: Page Description File). Moreover, the spooler 302 acquires processing setting (N-up, double face printing, stapling, color/monochrome specification, etc.) regarding print data that is being set for the printer driver 203 from the printer driver 203, and stores it in the spool file 303 as a file in units of job. This setting file stored in units of job is called a job setting file (often called SDF in short: a spool description file). This spool description file will be described later. Note that the spool file 303 is generated in the external memory 11 as a file, but may be generated in the RAM 2. Furthermore, the spooler 302 loads a spool file manager 304 stored in the external memory 11 into the RAM 2, and notifies the spool file manager 304 of a generation situation of the spool file 303. Then, the spool file manager 304 determines whether printing can be performed according to the contents of the processing setting on the print data stored in the spool file 303.

If the spool file manager 304 determines that printing could be performed using the graphic engine 202, it loads the despooler 305 stored in the external memory 11 into the RAM 2. Then, the spool file manager 304 directs the despooler 305 to perform a control command generating process based on the page description file of the intermediate code described in the spool file 303.

The despooler 305 processes the page description file of the intermediate code included in the spool file 303 according to the job setting file including processing setting information contained in the spool file 303 to regenerate the GDI function, and outputs the GDI function through the graphic engine 202 again. In doing so, for generation of a command related to printing of the copy-forgery-inhibited pattern image, the tint block processing section 205 is loaded to perform the processing.

The printing system according to the embodiment of the present invention has the tint block processing section 205 similar to the one illustrated in FIG. 5. In conjunction with a despooler 305, a spool file manager 304, and others, the tint block processing section 205 pertains to printing a copy-forgery-inhibited pattern image and carries out a process of generating a copy-forgery-inhibited pattern image command, as described later.

Note that the tint block processing section 205 may be a built-in module of a printer driver 203 or may be in the form of a library module which is added by individual installation.

If the print instruction (DDI function) that the dispatcher 301 received from the graphic engine 202 is one that is based on the print instruction (GDI function) issued by the despooler 305 to the graphic engine 202, the dispatcher 301 sends the print instruction to the printer driver 203, not to the spooler 302. The printer driver 203 generates a printer control command made of a page description language etc. based on the DDI function obtained from the graphic engine 202, and outputs it to the printer 1500 through the system spooler 204.

Further, FIG. 6 shows an example in which a previewer 306 and a setting change editor 307 are placed in addition to the expansion system mentioned above, so that preview including preview of the copy-forgery-inhibited pattern image, printing setting change, and binding of two or more jobs are made possible.

The contents being set up in the property of the printer driver in this way are stored in the structure (called DEVMODE in Windows (registered trademark) OS) that the OS provides as a setting file. The structure contains, for example, setting as to whether storing in the spool file manager 304 is performed in the processing setting kept in the spool file 303. When the spool file manager 304 has read the processing setting through the printer driver and a specification of storage has been made, the page description file and the spool description file are generated and stored in the spool file 303 as described above. Moreover, a window screen of the spool file manager is popped up to display a list of jobs spooled in the spool file 303.

If preview of a certain single job or a combined job is specified on the window screen of the spool file manager, the previewer 306 stored in the external memory 11 is loaded into the RAM 2, and the previewer 306 is instructed to perform preview processing of the job in the intermediate code described in the spool file 303.

Storage Processing of Intermediate Print Data

Figure 7:
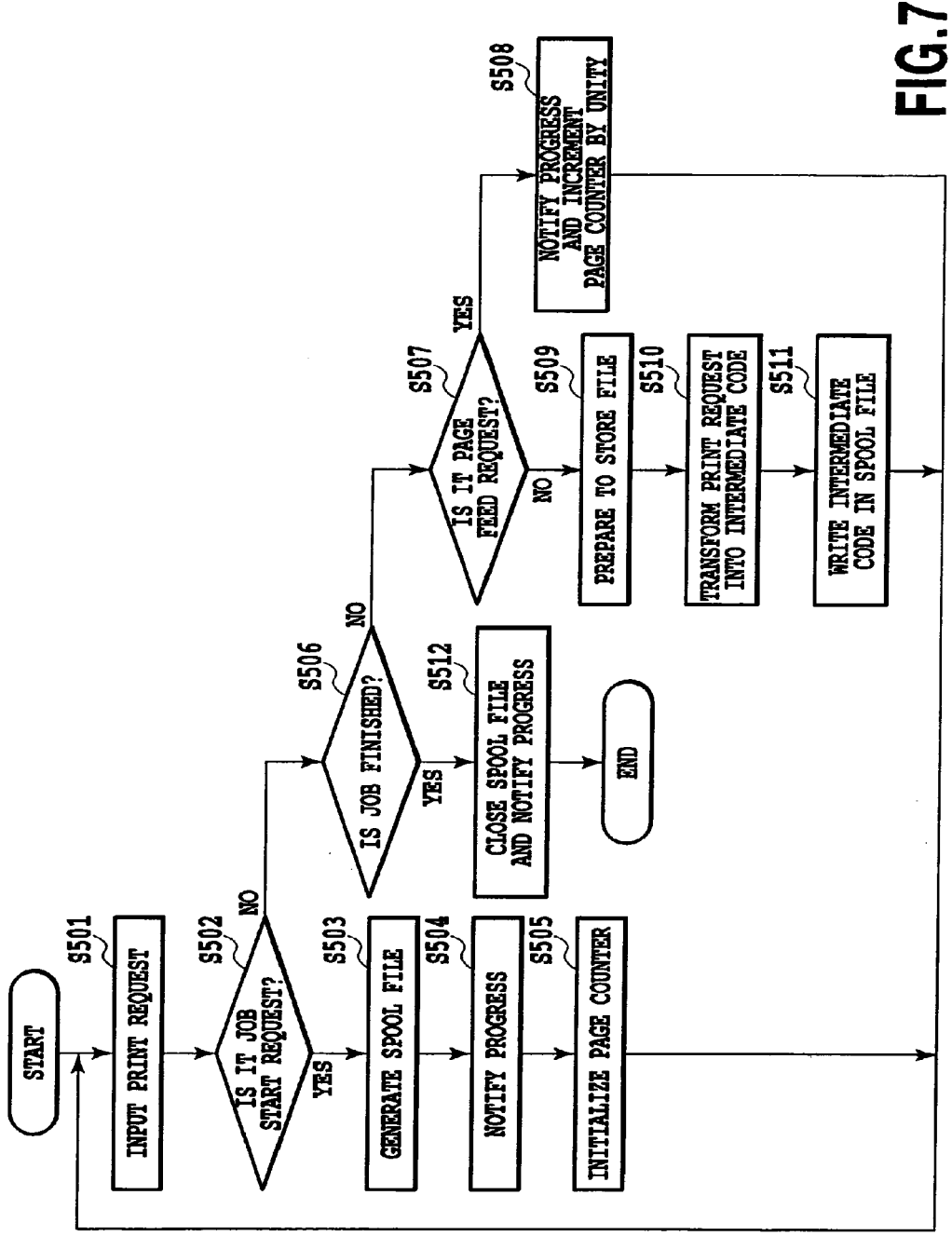
FIG. 7 is a view showing one example of a setup screen for output destinations of a print job.

FIG. 7 is a flowchart showing processing of a storing step for a unit of page in the spooler 302 generating the spool file 303.

Figure 8:
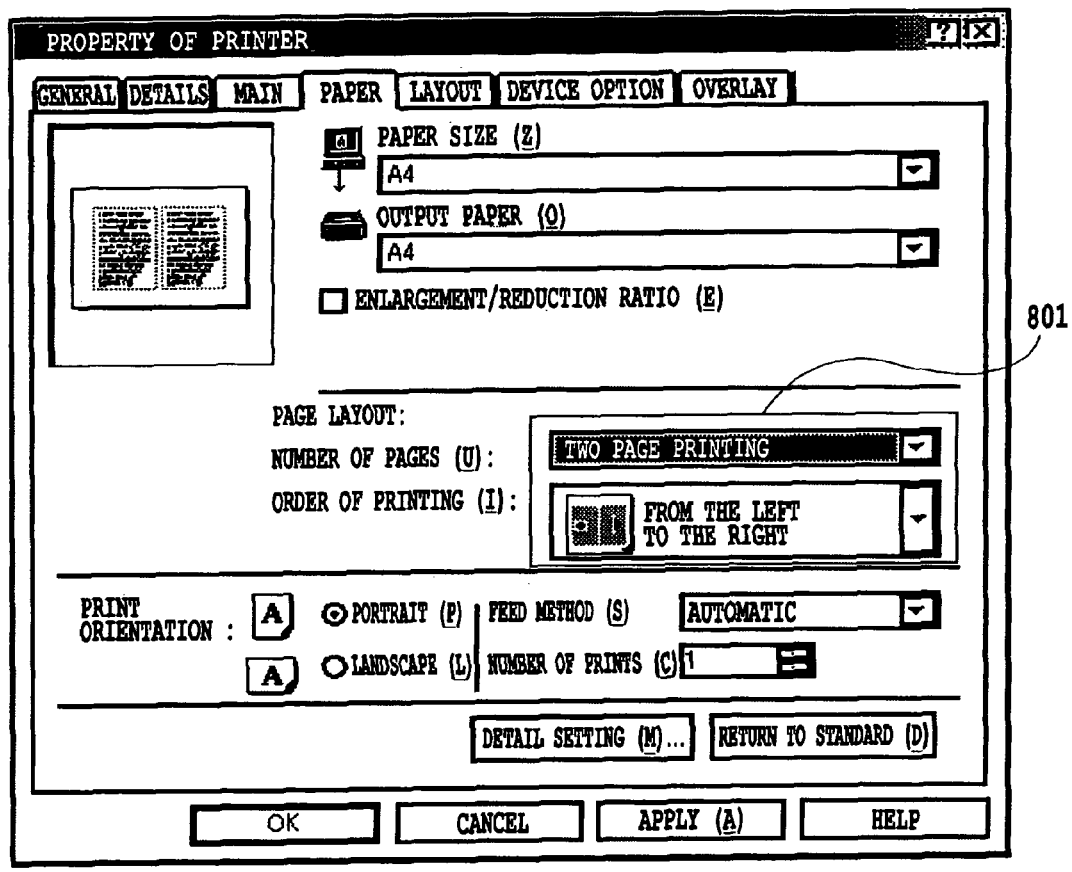
FIG. 8 is a view showing one example of the printing setting input dialog.

In this figure, first, the spooler 302 receives a print request from the application through the graphic engine 202 in Step S501. In the application, a dialog through which printing settings as shown in FIG. 8 are entered is displayed, and the printer driver passes the printing settings entered through this dialog to the spooler 302. The setting input dialog shown in FIG. 8 includes a setup entry, represented by numeral 801, to determine the number of logical pages to be laid out on one physical page, and the like.

In Step S502, the spooler 302 determines whether the received print request is a job start request. Here, if the request is determined to be the job start request in Step S502, the operation flow (the flow) proceeds to Step S503, where the spooler 302 generates a spool file 303 in which intermediate data is temporarily stored.

Subsequently, in Step S504, the spooler 302 notifies the spool file manager 304 of the progress of the print processing. In subsequent Step S502, the spooler 302 initializes a page number counter thereof to unity. Here, the spool file manager 304 reads and stores information of the job for which printing is started, processing setting, or the like from a spool file 303.

On the other hand, in Step S502, if the request is determined not to be the job start request, the flow proceeds to Step S506. In this Step S506, the spooler 302 determines whether the received request is a job end request. If the request is determined not to be the job end request, the flow proceeds to Step S507, where the spooler 302 determines whether the request is a page feed request. If the request is determined to be the page feed request in Step S507, the flow proceeds to Step S508, where the spooler 302 notifies the spool file manager 304 of the progress of the print processing. Then, the spooler 302 increments the page counter, closes the page description file storing the intermediate codes, and generates a next page description file. If the spooler 302 determines that the received request is not a page feed request in Step S507, the flow proceeds to Step S509, where the spooler 302 prepares writing of the intermediate codes in the page description file.

Next, in Step S510, in order to store the print request in the spool file 303, the spooler 302 transforms the DDI function of the print request into the intermediate code. In Step S511, the spooler 302 writes the print request (intermediate code) transformed into a storable form in Step S510 in the page description file of the spool file 303. Then, the flow returns to Step S501 to receive a print request from the application again. This process consisting of a series of Step S501 through Step S511 is continued until a job end request is received from the application. Moreover, the spooler 302 acquires simultaneously information of processing setting stored in a DEVMODE structure from a printer driver 203, and stores it in a spool file 303 as the job setting file.

On the other hand, if the spooler 302 determines a print request from the application to be a job end request in Step S506, the flow proceeds to Step S512 because the print request from the application has been all completed. There the spooler 302 notifies the spool file manager 304 of the progress of the print processing and finishes the processing.

Generation of Spool File

Figure 9B:
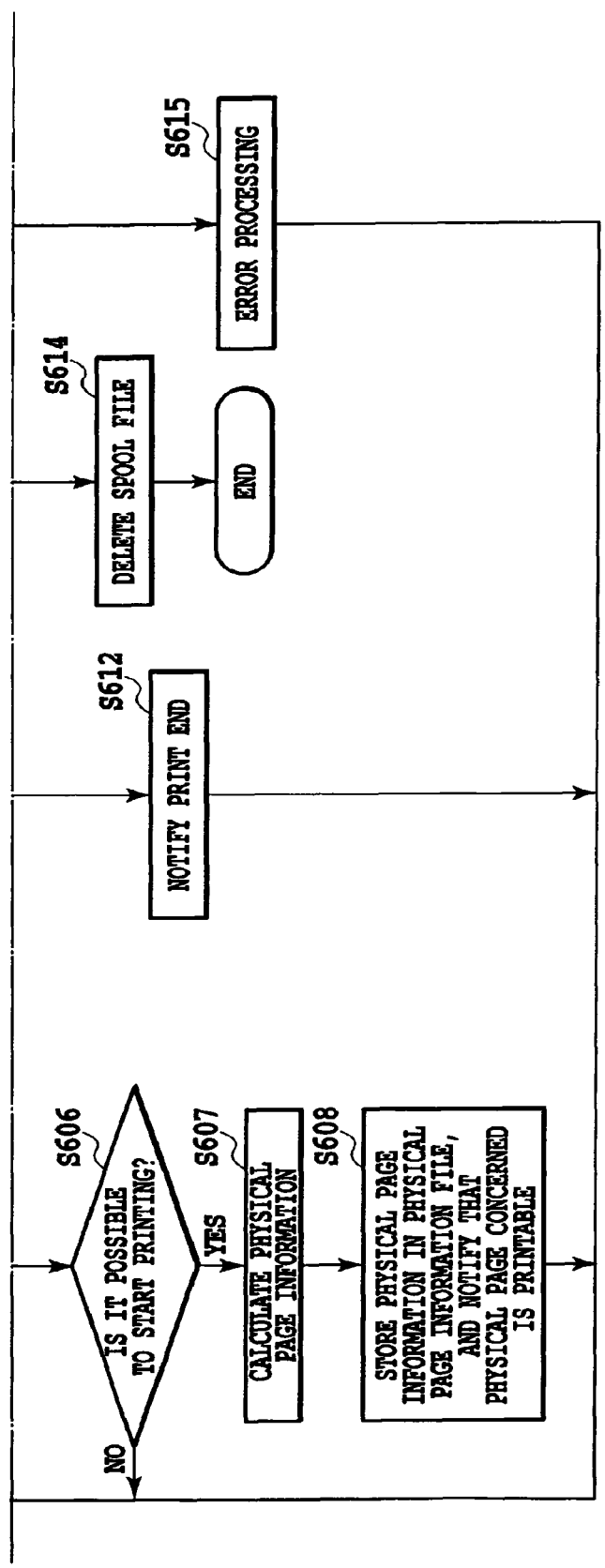

FIGS. 9A and 9B illustrate a flowchart showing details of control between the spool file 303 generating process and the print-data generating process in the spool file manager 304.

In Step S601, the spool file manager 304 receives a notification of the progress of the print processing from the spooler 302 or the despooler 305. Then, in Step S602, the spool file manager 304 determines whether the notification of progress is a print start notification from the spooler 302 notified in the above-mentioned Step S504. If the notification is the print start notification, the flow proceeds to Step S603, where the spool file manager 304 reads processing setting of printing from the spool file 303 and starts management of the job.

On the other hand, in Step S602, if the notification is not the print start notification from the spooler 302, the flow proceeds to Step S604. In Step S604, the spool file manager 304 determines whether the notification of progress is a print end notification of one logical page from the spooler 302 notified in the above-mentioned Step S508. Here, if the notification is the print end notification of one logical page, the flow proceeds to Step S605, where the logical page information for this logical page is stored. Then, in subsequent Step S606, the spool file manager 304 determines whether printing of one physical page can be started for n-logical pages whose spooling has ended at this time. Here, if being printable, the flow proceeds to Step S607, where a physical page number is determined based on a logical number assigned to one physical page to be printed.

Calculation of physical pages is done as follows: for example, in the case where processing setting is such that four logical pages are arranged in one physical page, the first page becomes ready to be printed at the time when the fourth logical page has been spooled, the first page being outputted after the printing. Then, the second physical page becomes ready to be printed at the time when the eighth logical page has been spooled. Incidentally, even if the total number of logical pages is not a multiple of the number of logical pages arranged in one physical page, the logical pages arranged in one physical page can be determined with a spool end notification in Step S512.

Figure 11:
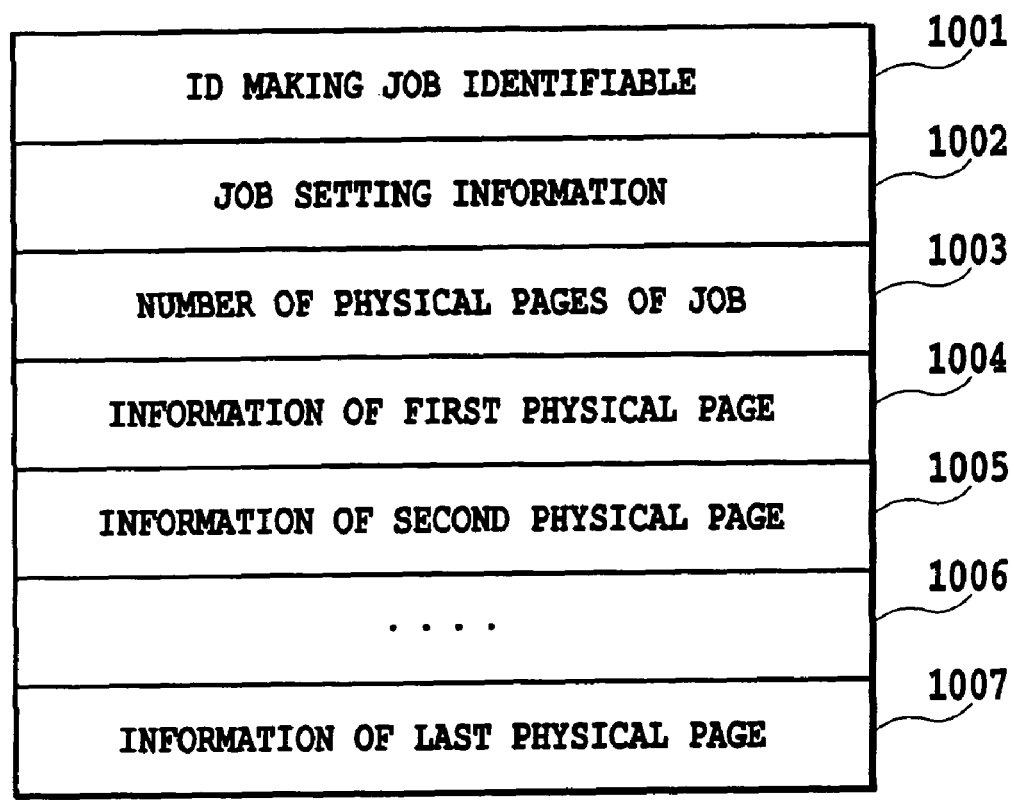
FIG. 11 is a view showing one example of a data format that is passed to the despooler 305 from the spool file manager 304 when issuing a print request of physical pages thereto.

Further, in Step S608, information of logical page numbers constituting physical pages that become ready to be printed, their physical pages, or the like are stored in a job-output setting file (a file containing physical page information). FIG. 11 shows a storing format. It is notified to the despooler 305 that physical page information has been added for one physical page. Subsequently the flow returns to Step S601 to wait for a next notification. In this embodiment, the print processing is possible when one page of print data, i.e., logical pages constituting one physical page, is spooled, even if the whole print job has not been finished.

On the other hand, when a notification of progress is not a print end notification of one logical page from the spooler 302 in Step S604, the flow proceeds to Step S609, where the spool file manager 304 determines whether the notification is a job end notification from the spooler 302 notified in the above-mentioned Step S512. Here, if the notification is the job end notification, the flow proceeds to the above-mentioned Step S606. On the other hand, if the notification is not the job end notification, the flow proceeds to Step S610, where the spool file manager 304 determines whether the received notification is a print end notification for one physical page from the despooler 305. Here, if the notification is the print end notification for one physical page, the flow proceeds to Step S612, where the spool file manager 304 determines whether the whole of the processing setting has been finished. If the process is finished, the flow proceeds to Step S612, where the spool file manager 304 notifies the spooler 305 of termination of the processing. On the other hand, if it is determined that the process of processing setting has not been finished, the flow proceeds to the above-mentioned Step S606. The despooler 305 in this embodiment takes one physical page as a unit by which the despooler 305 performs the print processing. Moreover, in Step S608, adopted is a style that information necessary to perform the print processing of one physical page is stored in a file sequentially, so that the file is reusable. If reuse is unnecessary, the information processing apparatus may be of an implementation type that a fast medium, such as shared memory, is used and the medium is overwritten in units of physical page successively to enhance the speed and save resources. Moreover, in the case where the progress of despooling is faster than the progress of spooling or in the case where despooling is started after the termination of the spooling of all pages, by notifying the content that a plurality of physical pages or all physical pages become printable in response to the progress of despooling side, without notifying that page printing is possible for each physical page, in Step S608, then number of notifications can be saved.

If the notification is determined not to be a print end notification of one physical page from the despooler 305 in Step S610, the flow proceeds to Step S613, where the spool file manager 304 determines whether the notification is a print end notification from the despooler 305. If the notification is determined to be the print end notification from the despooler 305, the flow proceeds to Step S614, where the spool file manager 304 deletes a corresponding page description file 303 and finishes the processing. On the other hand, if the notification is not the print end notification from the despooler 305, the flow proceeds to Step S615, where the spool file manager 304 performs other normal processing and waits for a next notification.

Output of Spool File

Figure 10:
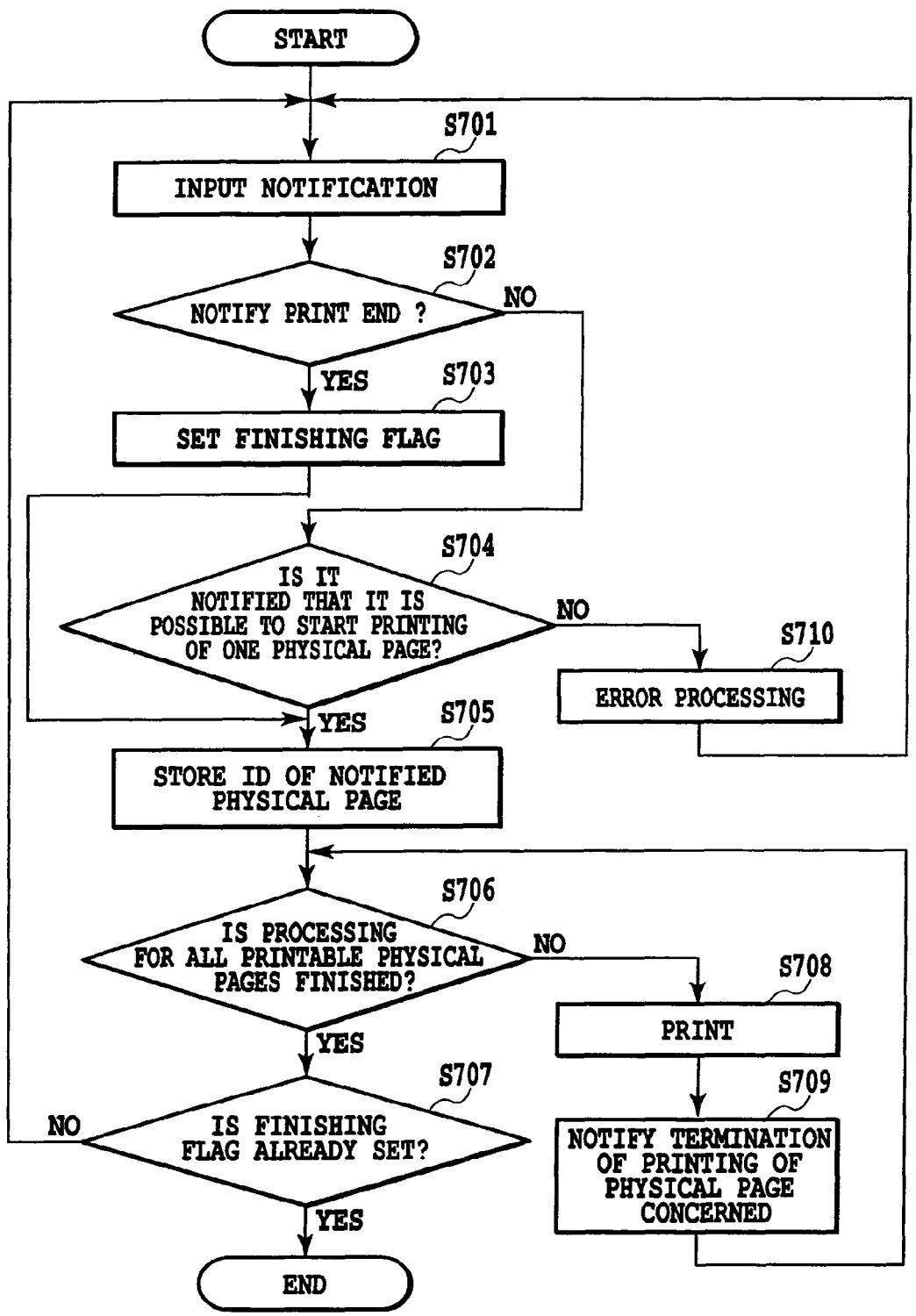
FIG. 10 is a flowchart showing details of the print-data generating process in a despooler 305.

FIG. 10 is a flowchart showing details of the print-data generating process in the despooler 305.

In response to a print request from the spool file manager 304, the despooler 305 reads necessary information (page description file and spool description file) from the spool file 303 and, generates print data. A method of transferring the generated print data to the printer is as already discussed in FIG. 6. Moreover, print data is in PDL as already discussed.

In generating print data, first a notification from the above-mentioned spool file manager 304 is inputted to the despooler 305 in Step S701. In subsequent Step S702, the despooler 305 determines whether the inputted notification is a job end notification. If the notification is the job end notification, the flow proceeds to Step S703, where the despooler 305 set an ending flag, and the flow proceeds to Step S705. On the other hand, if the notification is not the job end notification in Step S702, the flow proceeds to Step S704, where the despooler 305 determines whether the print start request of one physical page in the above-mentioned Step S608 was notified. If the notified request is not determined to be the print start request in Step S704, the flow proceeds to Step S710, where the despooler 305 performs other error processing, and the flow returns to Step S701 to wait for a next notification.

On the other hand, if the request is determined to be the print start request of one physical page in Step S704, the flow proceeds to Step S705, where the despooler 305 saves the ID of printable physical pages notified in Step S704. In subsequent Step S706, the despooler 305 determines whether the print processing has been finished for all physical pages whose IDs are saved in Step S705. Here, if all physical pages have been processed, the flow proceeds to Step S707, where the despooler 305 determines whether an ending flag is set in the above-mentioned Step S703. If the ending flag is set, the job is assumed to have been printed, the despooler 305 notifies the spool file manager 304 of termination of the processing thereof and finishes the processing. In Step S707, if the ending flag is not set, the flow returns to Step S701 to wait for a next notification.

On the other hand, if it is determined that printable physical pages are remaining in Step S706, the flow proceeds to Step S708, where the despooler 305 reads IDs of unprocessed physical pages from saved physical page IDs successively, reads information necessary to generate print data of physical pages corresponding to the read physical page IDs, and perform the print processing. To perform the print processing, the despooler 305 transforms a print instruction stored in the spool file 303 into a format (GDI function) conceivable to the graphic engine 202 and transfers it. For the processing setting to lay out a plurality of logical pages in one physical page (hereinafter referred to as N-page printing), the despooler 305 transforms it considering size reduction and arrangement in this step.

When having finished necessary print processing, the despooler 305 notifies the spool file manager 304 of termination of print data generation of one physical page in subsequent Step S709. Then, the flow returns to Step S706 again, and Steps S708, S709, and S706 are repeated until the print processing is performed for all IDs of printable physical pages saved in Step S705.

The above is a flow of the print processing using the dispatcher 301, the spooler 302, the spool file manager 304, and the despooler 305. By processing as described above, the application 201 is released from the print processing at the time when the spooler 302 generates the intermediate code and stores it in the spool file 303; therefore, the print processing can be finished in a shorter time than the print data is directly outputted to the printer driver 203. Moreover, since the intermediate files (the page description file and the spool description file) based on printing settings of the printer driver are kept temporarily in the spool file 303, the user is enabled to recognize a print preview of what will be printed actually. Moreover, since the intermediate file is being kept, a combination and rearrangement of print jobs generated by two or more applications become possible, and alteration of the printing setting is feasible without launching the application again to perform printing.

Note that the job-output setting file is generated at the time of requesting the graphic engine 202 to perform printing in the print processing using the spooler 302, and that the job-output setting file is also generated when preview, job combination, or the like is performed. The job-output setting file is equal to the spool description file in the case of a single job; the job-output setting file is generated based on two or more pieces of the job setting information in the case of a combined job. Here, the job-output setting file will be described.

Composition of Job-Output Setting File

FIG. 11 shows an example of the job-output setting file keeping information constituting physical pages that has been generated to be printable by the spool file manager 304 in Step S608. The field 1001 is for an ID used for identifying a job. This ID can also be kept in the form of the name of a file name or the name of shared memory that keeps this information. The field 1002 is for the job setting information. The job setting information includes one piece of information that can be set up for one job as follows: a structure necessary to start printing of a job for the graphic engine 202; specifications of N-page printing; specifications of additional drawing, such as a page frame; finishing specifications, such as the number of copies and stapling; and the like. In the job setting information 1002, enough information is stored according to functions for the job. The field 1003 is for the number of physical pages of a job, which indicates as much pieces of physical page information as this figure are stored in subsequent fields after this. Since this embodiment adopts a system of notifying the number of printable physical pages, the equipment can work without this field. After this field, a field 1004 through the last field store physical page information to the number stored in the field 1003. Physical page information will be described in FIG. 14.

Figure 12:
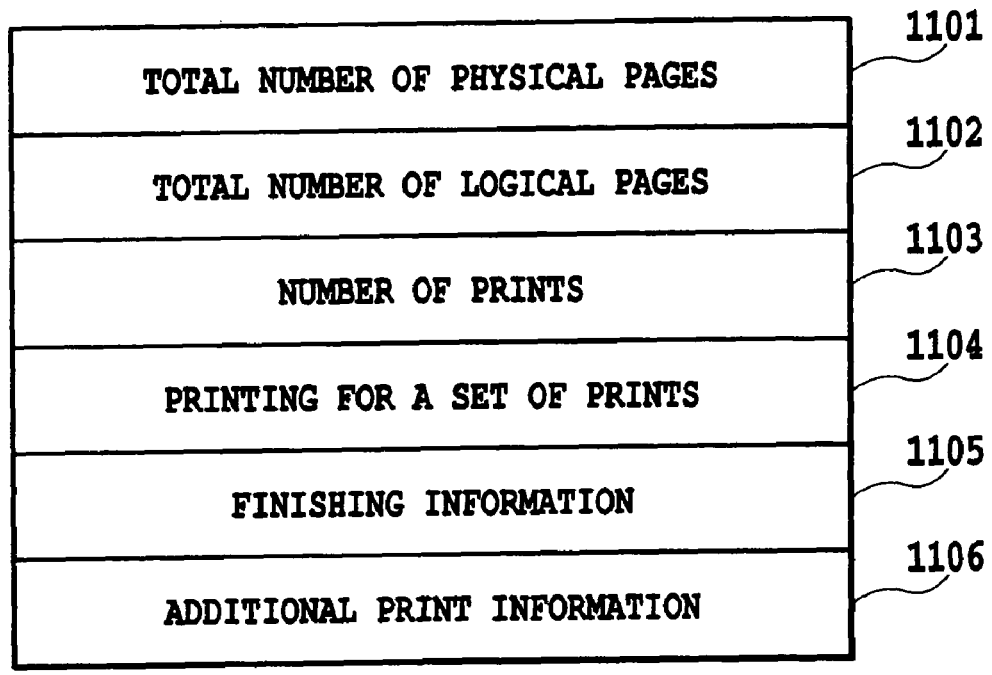
FIG. 12 is a view showing one example of job setting information shown in the field 1002 of FIG. 11.

FIG. 12 is a view showing one example of the job setting information shown in the field 1002 of FIG. 11. The field 1101 is for the total number of physical pages. The field 1102 is for the total number of logical pages. The fields 1101 and 1102 are used in the case of printing the number of pages etc. as additional information in addition to the print data, and in other cases. When printing is being continued, the both fields are set to temporal values, or the spool file manager 304 postpones generation of information of printable physical pages until the printing is finished. A field 1103 is for number-of-copies information that specifies how many copies of this print job should be printed. A field 1104 is for specifying whether printing should be done by making collated sets of copies in the case where the field 1103 specifies printing of two or more sets of copies. A field 1104 is for specifying finishing information, such as stapling, punching, and Z-character folding, which is specified in the case where the printer has a finisher in it or outside the printer. A field 1106 is for storing addition print information that is added to a job as follows: the tint block printing according to the present invention; decoration such as a page frame; additional information such as date; user name; the number of pages; watermark printing; etc. As the number of functions increases, the number of fields included in this job setting information increases. For example, in the case where the printer is capable of double face printing, a field for storing specifications of double face printing is added.

Figure 13:
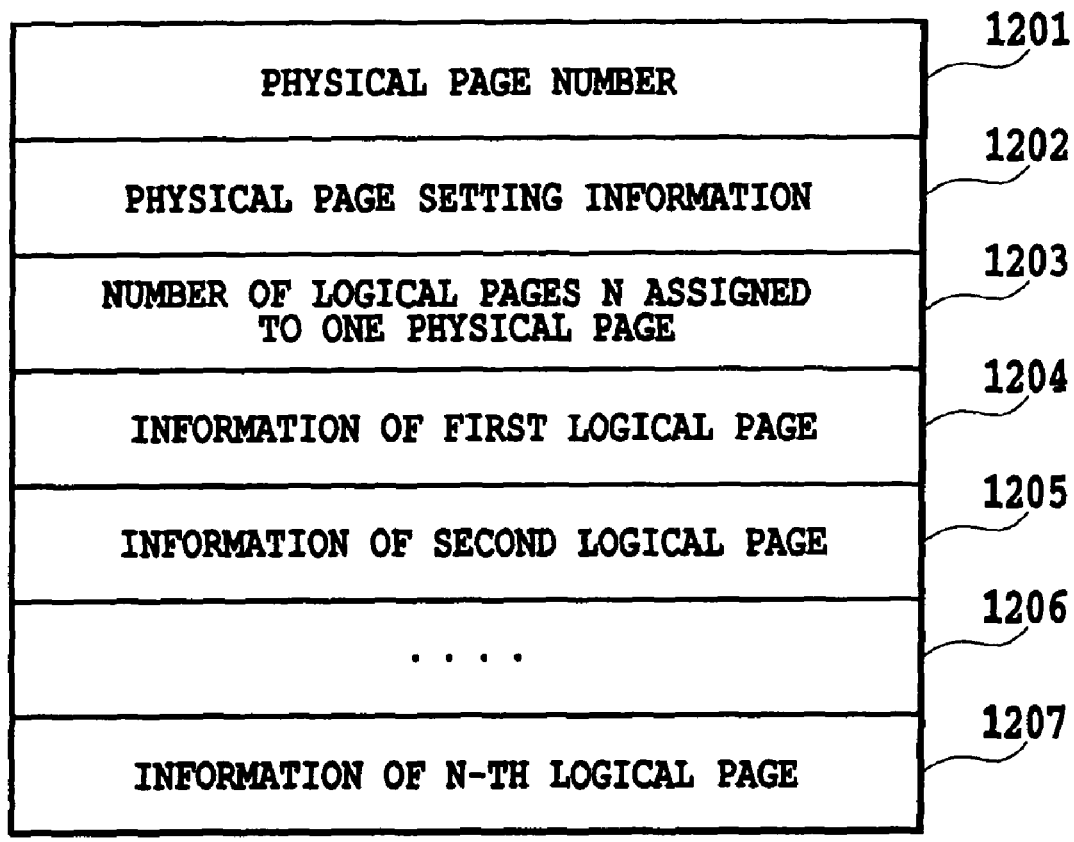
FIG. 13 is a view showing one example of a data format that is passed to the despooler 305 from the spool file manager 304 when issuing the print request of physical pages thereto.

FIG. 13 is a view showing one example of the physical page information shown in the field 1004 of FIG. 11. The first field 1201 is for physical page number, whose value is used in managing the order of printing and in printing the physical page number additionally. The field 1202 is for physical page setting information, storing settings of layout and color/monochrome if layout and color/monochrome can be specified for each physical page. The field 1203 is for the number of logical pages allocated to this physical page; when four pages are allocated to one physical page, an ID indicating "4" or "four page printing" is stored. The field 1204 and subsequent fields store information of the logical page by the number specified by the field 1203. The may be a case where the actual number of page data becomes fewer than the number of pages specified by the field 1203 depending on the number of pages printed by the application 201. In that case, this discrepancy is coped with by storing special data indicating an empty page in the logical page information.

Figure 14:
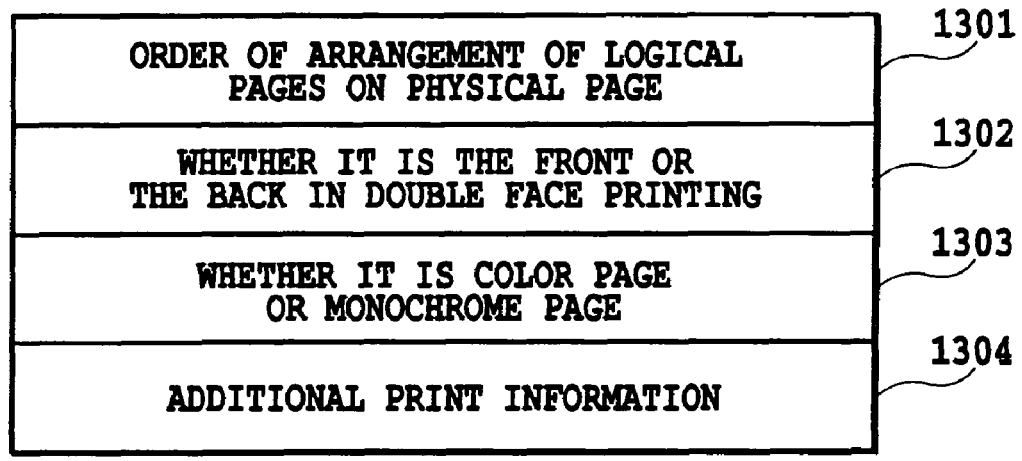
FIG. 14 is a view of an example of physical page setting information in the field 1202 in FIG. 13.

FIG. 14 shows an example of the physical page setting information in the field 1202. The field 1301 stores the designation of the order of placement of logical pages on physical pages (in the horizontal direction from the top left or in the vertical direction from the top left) when N pages are printed on one actual page. Some systems place the logical page information items following the field 1204 in the order of placement rather than in the order of the page numbers, instead of using the setting of the field 1301. The field 1302 provides information about the front and back of the double-sided printing, which is used for aligning the binding margin on both sides. The field 1303 indicates the designation as to whether the page is a color page or monochrome page, and enables the color/monochrome mode designation on a physical page basis. The field 1304 provides additional print information used for printing additional information such as the number of pages or date on the physical pages. As for the physical page setting information, a field is added in accordance with the functions of the system.

In this embodiment, since the copy-forgery-inhibited pattern image printing explained with reference to FIG. 16 and thereafter is information added to the physical page, it is also stored in the field 1304 as setting information for each physical page based on information about the tint block printing kept in the field 1106 shown in FIG. 12. One example of data format used for storing the setting information about the tint block printing in the additional print information 1106 and the additional print information 1304 for a job will be described later with reference to FIG. 18.

Figure 15:
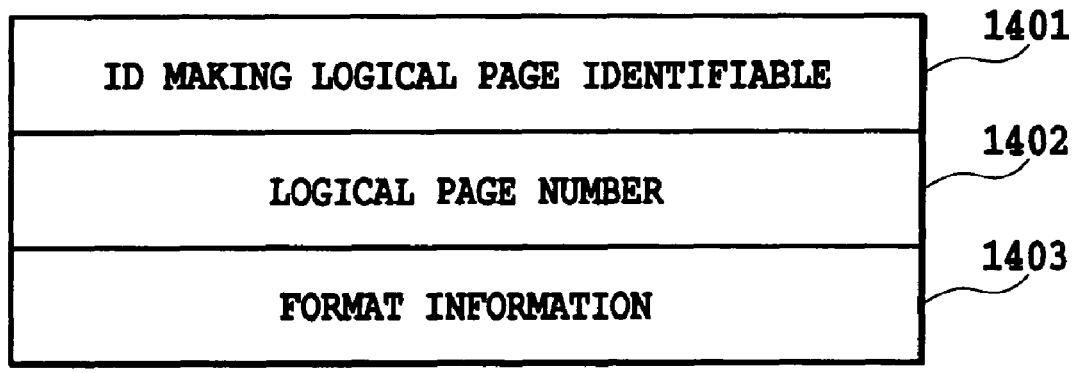
FIG. 15 is a view showing one example of a data format that is passed to the despooler 305 from the spool file manager 304 when issuing the print request of physical pages thereto.

FIG. 15 is a view showing one example of logical page information shown in the field 1204. The field 1401 is for the ID of a logical page, and using this ID an intermediate code of the page description file corresponding to the logical page is referred from the spool file 303. This ID is just required to allow access to the intermediate code of the logical page using this ID, and may be a file, a memory pointer, or the intermediate code itself constituting the logical page. The field 1402 is for the logical page number, and is used in the case of printing the logical page as additional information or used as supplementary information to the logical page ID. Various setting entries that can be stored in units of logical page are stored in the field 1403 of format information. For example, information of various setting specified in units of logical page, such as additional printing information, such as a page frame, and enlargement/reduction ratio. Moreover, if necessary, it is also possible to store attribute information for logical page, such as color/monochrome information for each logical page. On the contrary, in such a system as requires neither switching of the settings in units of logical page nor attribute information for each logical page, the field 1403 is unnecessary.

The job-output setting file is composed as described above. In addition, the spool description file is almost the same as the job-output setting file; for job information, consisting of printing appearance (single-sided/double-sided, printing and book binding), printing layout (N-up, poster printing), additional information (tint block printing information, watermarking, date, username, etc.), the number of copies, and paper size; and for each physical page, consisting of arrangement order of logical pages, whether it is the front or the back in double face printing, a color mode, etc.

Further FIG. 6 shows an example in which the setting change editor 307 with a function of changing settings of a job is placed in addition to the expansion system that has heretofore been described. The setting change editor 307 is an editor that can change interactively the contents of the spool description file or the job-output setting file both mentioned above. Since the setting change editor 307 is not related to the present invention directly, its explanation is omitted.

Explanation of Print-Data Generating Process of Copy-Forgery-Inhibited Pattern Image One embodiment of the present invention relates to a configuration in which the user selects either watermark printing of a copy-forgery-inhibited pattern image or superposition printing of the copy-forgery-inhibited pattern image arbitrarily. To be concrete, the user selects either the watermark printing or the superposition printing through an interface with a radio button 2210 used for selecting either the watermark printing or the superposition printing both shown in FIG. 17, whereby the final order of superposition of the copy-forgery-inhibited pattern image data and the printout image data (manuscript data) is determined. Then, according to the order, the watermark printing of the copy-forgery-inhibited pattern image explained in FIG. 22 or the superposition printing of the copy-forgery-inhibited pattern image explained in FIG. 23 is performed. Concrete contents of the watermark printing and the superposition printing will be described later.

Figure 16:
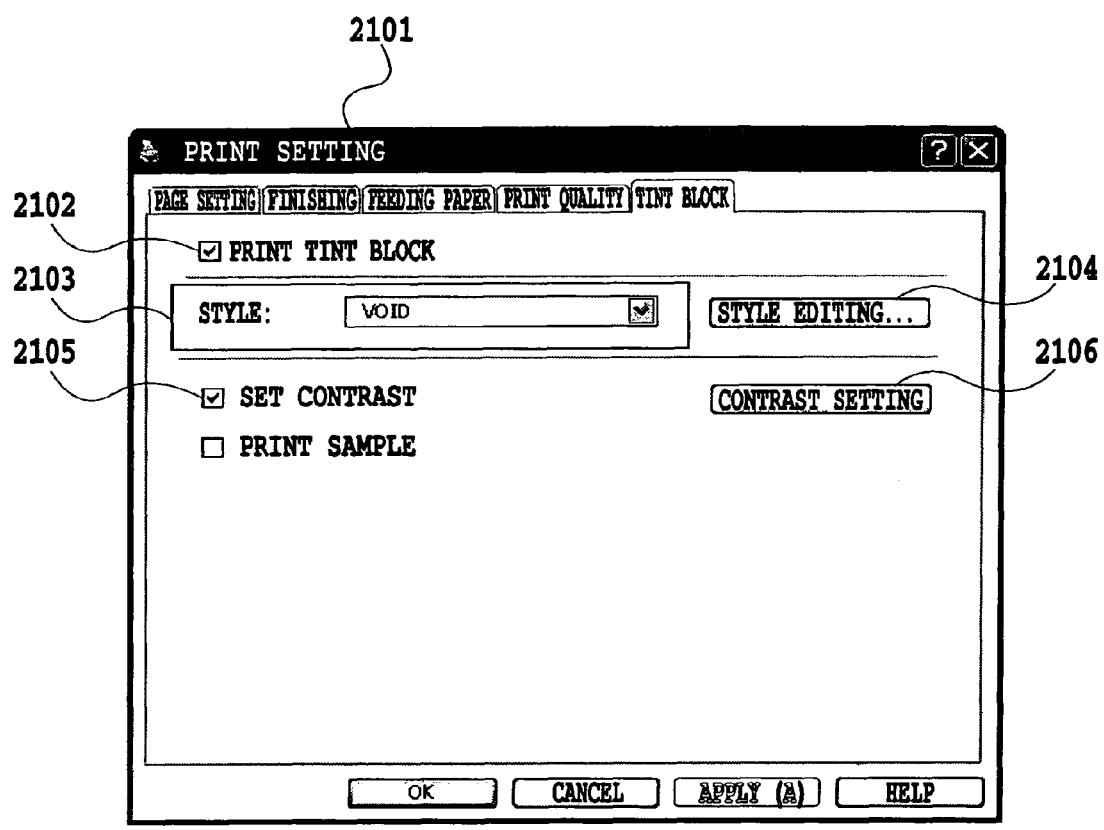
FIG. 16 is a view showing one example of a setup screen of tint block printing function.
Figure 17:
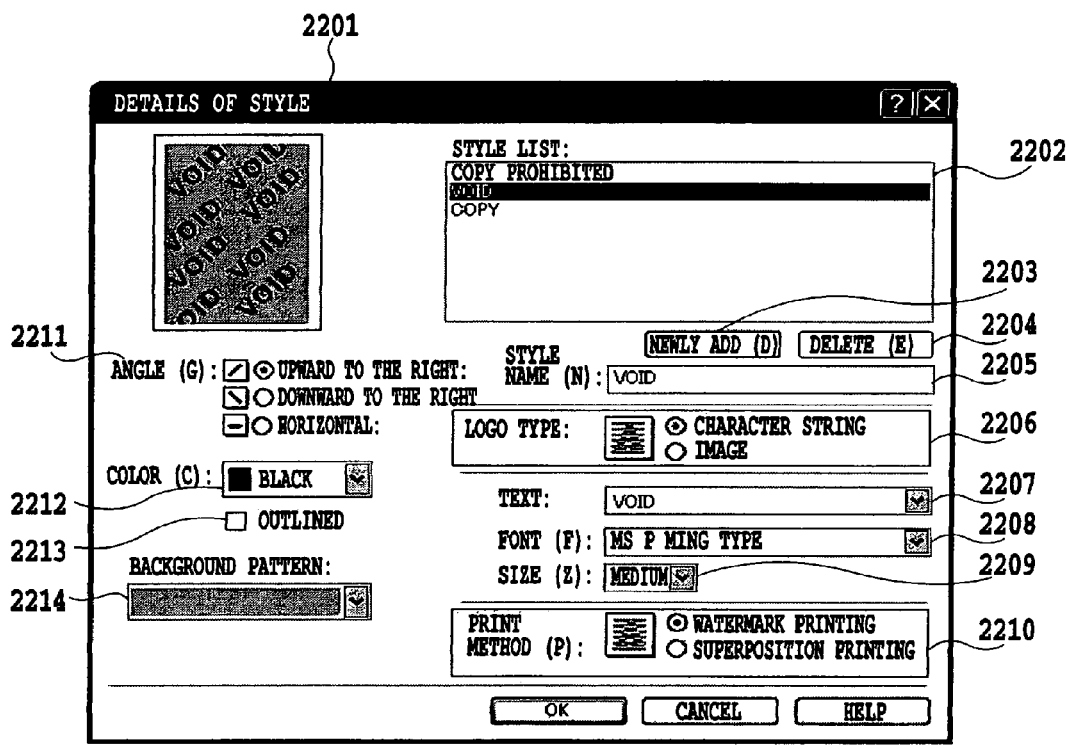
FIG. 17 is a view showing one example of the dialog used for editing detailed setting of the tint block printing function.

FIG. 16 through FIG. 17 are views showing one example of the user interface by which a setup about the copy-forgery-inhibited pattern image printing is performed.

FIG. 16 is one example of an initial screen of the user interface related to the tint block printing, the user interface being placed in the printer driver 203. In this example, the user interface allows the user to make settings about the tint block printing in a property sheet 2101 in the dialog.

Figure 18:
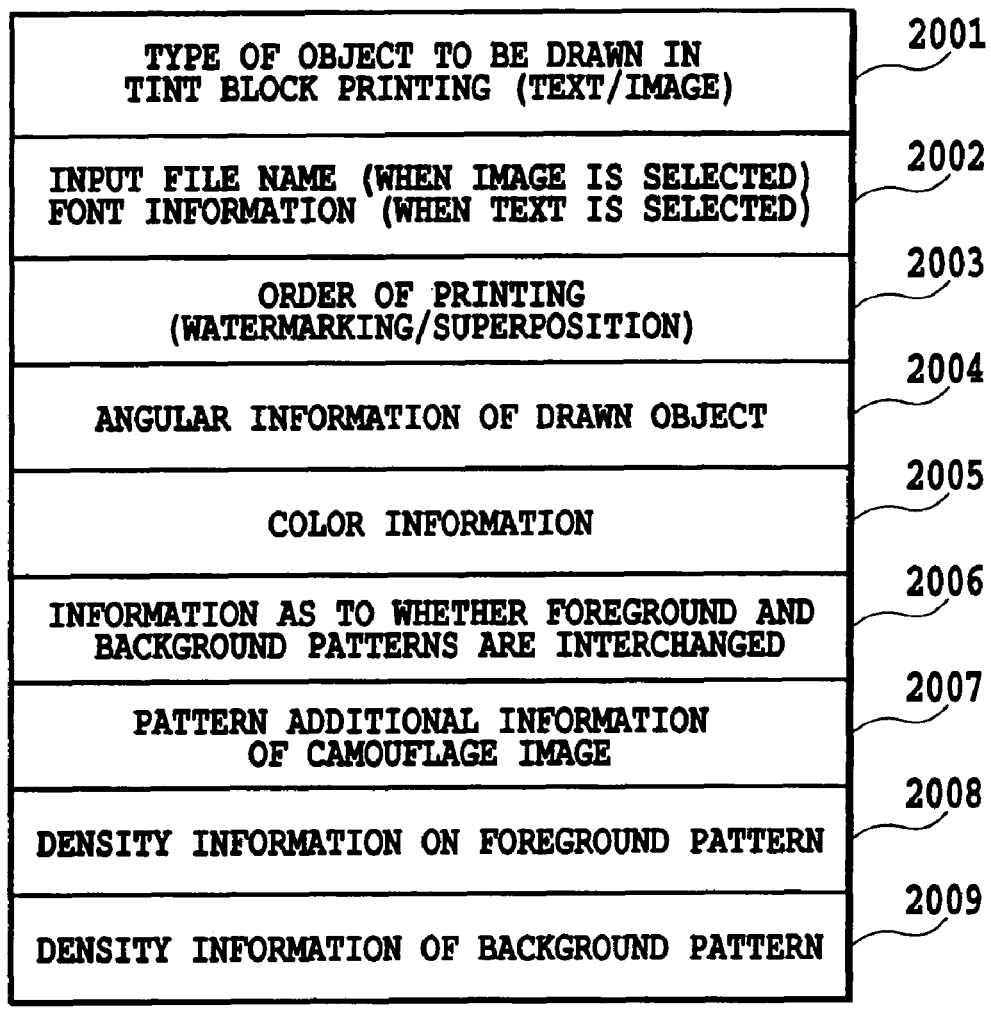
FIG. 18 is a view showing one example of the data format of additional print information 1304 in FIG. 14.

The check box 2102 is used for designating a printing job whether to carry out tint block printing (printing including a copy-forgery-inhibited pattern image) or not. The designation is stored in the additional print information 1106 in FIG. 12 as the setting indicating whether to carry out the tint block printing. The list box 2103 indicates style information which makes it possible to designate a plurality of pieces of the setting information of the tint block printing by one identifier (style). The printer driver 203 can select a plurality of styles, and the relationships between the styles and the tint block printing information illustrated in FIG. 18 are registered in a registry. In addition, in response to a depression of the button 2104 by a user, the style-editing dialog 2201 as shown in FIG. 17 is displayed. The check box 2105 is used for adjusting the contrast between the foreground and background in the tint block printing. In response to the depression of the button 2106 by the user, the contrast adjusting screen (not shown) is displayed.

FIG. 17 is a view showing an example of a dialog for editing the advanced settings of each tint block printing.

In FIG. 17, in the copy-forgery-inhibited pattern image information editing dialog 2201, the resultant copy-forgery-inhibited pattern image generated from the individual pieces of the copy-forgery-inhibited pattern image information are displayed for a preview. The list box 2202 is an area for displaying the list of the styles selectable by the list box 2103 of FIG. 16. The user can newly add or delete the style using the buttons 2203 and 2204. The area 2205 displays the name of the style designated at present.

The radio button 2206 is to select the type of a drawn object used for the tint block printing. When the user selects the "string" with the radio button 2206, a text object is used, and when the user selects the "image", image data represented by BMP is used. In FIG. 17, since the "string" is selected, the setting information about the text object represented by the list boxes 2207 to 2209 is displayed in the dialog 2201, thereby enabling edition. In contrast, when the "image" is selected with the radio button 2206, the information items 2207 to 2209 are not displayed, but a file selection dialog not shown is displayed instead.

The list box 2207 indicates an area for displaying and editing the string to be used as the copy-forgery-inhibited pattern image. The list box 2208 indicates an area for displaying and editing the font information about the string. Although the present embodiment handles only the font name as the selection screen, the selection can be extended to family information about typefaces (such as bold and italic) and to ornament character information and the like. The list box 2209 is an area for displaying and setting the font size of the string to be used as the tint block pattern. Although the present embodiment assumes three font sizes of "large" "middle" and "small", a method of designating commonly used font sizes such as direct input of the point is also applicable. A radio button 2210 is used for setting the printing sequence of the tint block pattern and the manuscript data. When "watermark printing" is designated, the copy-forgery-inhibited pattern image is drawn on the bitmap memory of the printer, first, followed by overwriting the manuscript data on the copy-forgery-inhibited pattern image. In contrast, when "over-printing" is designated, the manuscript data is drawn first, followed by overwriting the copy-forgery-inhibited pattern image on the manuscript data. The detailed processing of the drawings will be described later.

The radio button 2211 is used for designating the placement angle of the tint block pattern. Although the present embodiment can select one of "right-side up", "right-side down", and "horizontal", it can be extended to a method of designating an angle such as providing a numerical input area enabling designation of any desired angle, or providing a slider bar enabling instinctive designation. The list box 2212 is an area for displaying and designating colors to be used for the tint block pattern (foreground pattern and background pattern). As for the options, full-intent colors such as magenta and cyan are selectable in addition to black shown in the drawing. The check box 2213 is used for exchanging the foreground pattern and the background pattern. When the check box is not checked, the foreground pattern emerges in the copying material at the printing, whereas when the check box is checked, the background pattern emerges at the printing so that the foreground pattern becomes hollow.

The list box 2214 indicates an area for designating a camouflage image for making it difficult to recognize the tint block pattern embedded in the manuscript, and can select the camouflage image from a plurality of patterns. It also provides an option that does not select a camouflage image.

Data Format of Tint Block Printing Setting Information

Next, formats of data stored in additional print information 1106, 1304 related to the tint block printing setting information described in FIG. 17 will be described using FIG. 18.

In this figure, the field 2001 stores a value indicating the type of drawing object (text or image) generated in the tint block printing that is specified in the area 2206 of FIG. 17. The field 2002 stores setting information for a drawing object specified by information in the field 2001 that is specified by areas 2207-2209 in FIG. 17. When text is selected, it stores a character string, a font name, and size information; when image is selected, it stores a location of the image file to be inputted. The field 2003 stores information that specifies whether the tint block pattern is drawn prior to or after the manuscript data (the order of drawing) and that is specified in the area 2210 of FIG. 17. The field 2004 stores information of an angle at which the drawing object is disposed and that is specified in the area 2211 of FIG. 17. The field 2005 stores information of colors that are used in the tint block pattern (foreground and background patterns) and that are specified in the area 2212 of FIG. 17. The field 2006 stores information as to whether the foreground pattern and the background pattern are interchanged and that is specified by the check box 2213 of FIG. 17. The field 2007 stores pattern additional information of a camouflage image specified in the area 2214 of FIG. 17. The field 2008 stores density information of the foreground pattern. The field 2009 stores density information of the background pattern.

Drawing Processing of Tint Block Pattern

Next, referring to FIGS. 19, 20 and 21, the processing of the tint block pattern color where the color processing mode decision means is selected for making a color/monochrome decision as to the manuscript data to be printed will be described. The processing is carried out after step S706 of FIG. 10 as pre-processing of step S708.

Figure 1:
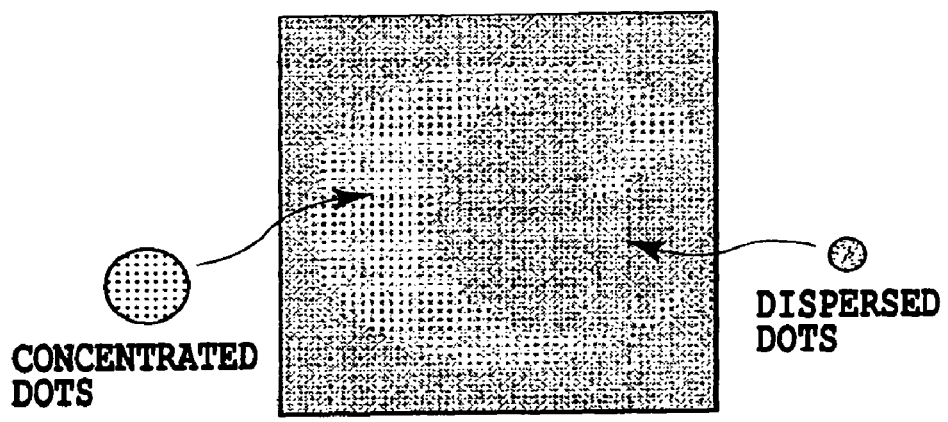
FIG. 1 is a view showing the latent image section and the background section that are two areas of the copy-forgery-inhibited pattern image.
Figure 2A:
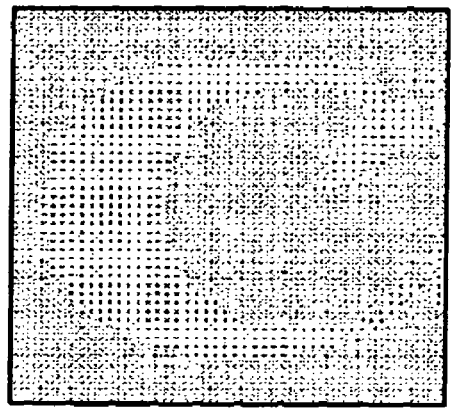
FIGS. 2A and 2B are views explaining a visualized image of the copy-forgery-inhibited pattern image.
Figure 2B:
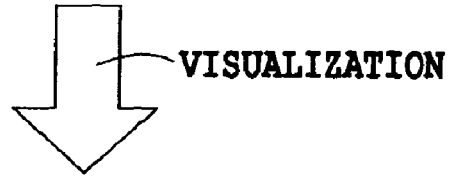
Figure 2B:
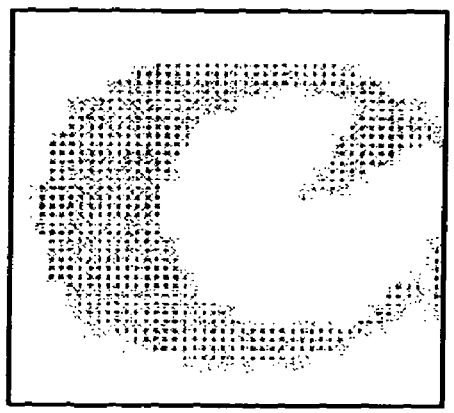
Figure 3:
FIG. 3 is a view showing an example of a user interface of a color processing mode designating method.
Figure 19:
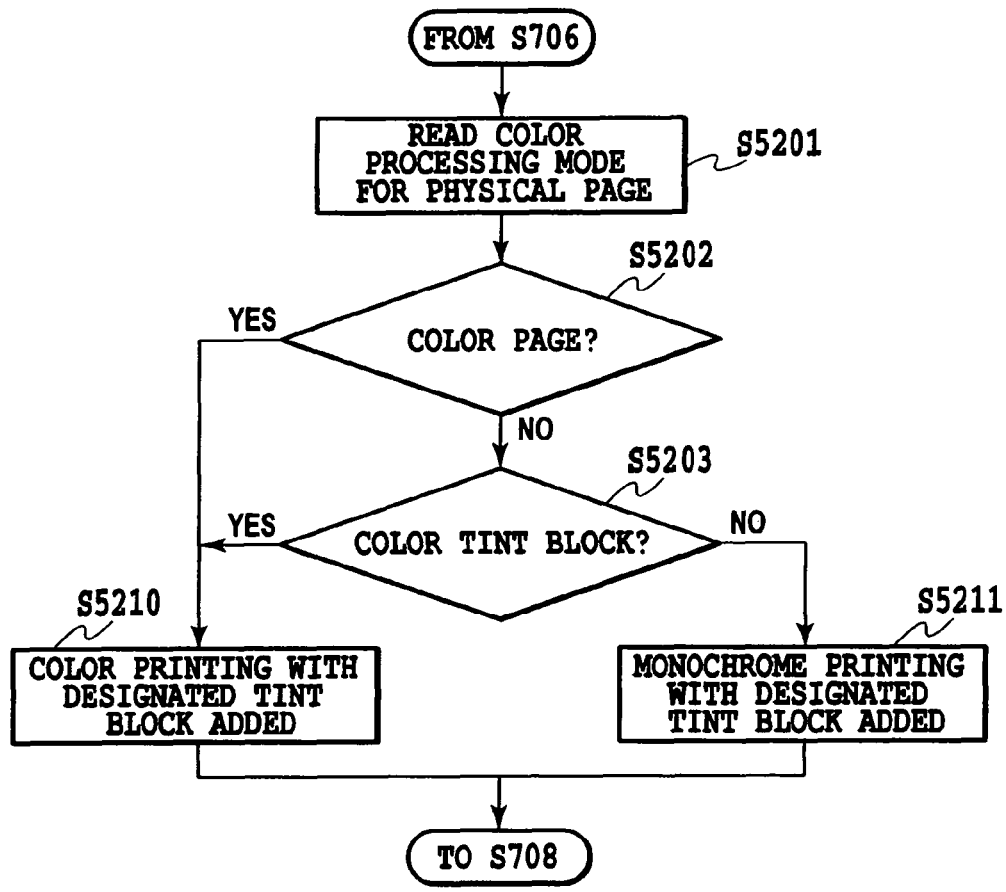
FIG. 19 is a flowchart illustrating an example of control of a manuscript and tint block color during the time when the color processing mode automatic is selected.

FIG. 19 shows the processing when the "full-color/monochrome automatic switching" is selected in the color printing mode 5101 in FIG. 3. In this case, according to the color information about the logical page included in each physical page, the color mode for printing the physical page is decided. If one of the decision result of the color of the manuscript and the setting of the tint block color indicates color, the color mode is primarily selected.

At step S5201, the color processing mode 1303 for the physical page to be subjected to the printing processing is read. At step S5202, if the color processing mode of the physical page to be drawn indicates a monochrome page, the processing proceeds to step S5203, whereas if it indicates a color page, the processing proceeds to step S5210. At step S5203, if the designated tint block setting indicates color, the processing proceeds to step S5210, whereas if the tint block setting indicates monochrome, the processing proceeds to step S5211. At step S5210, the printing processing is carried out in the color mode using the designated tint block setting, followed by proceeding to step S708. At step S5211, the printing processing is carried out in the monochrome mode using the designated tint block setting, followed by proceeding to step S708.

Figure 20:
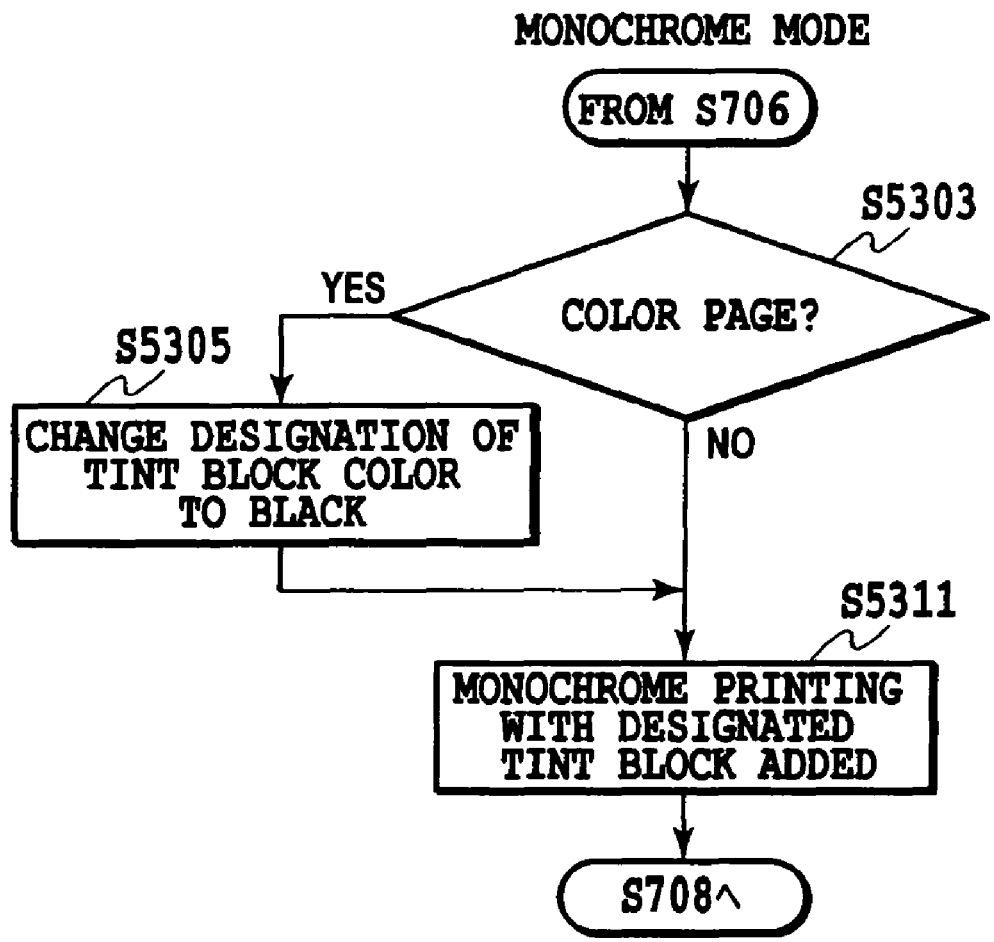
FIG. 20 is a flowchart illustrating an example of control of a manuscript and tint block color during the time when the color processing mode monochrome is selected.

FIG. 20 shows processing when "monochrome" is selected in the menu 5101 of FIG. 3. In this case, the color of the manuscript undergoes the monochrome conversion so that the final printing material is printed in monochrome. As for the tint block, even if the setting of the tint block of the user is color, the color is changed to monochrome (black), followed by outputting. This is the point that the control of the tint block section differs from that of the flowchart of FIG. 19.

At step S5303, if the designated tint block setting indicates color, the processing proceeds to step S5305, whereas if the tint block setting indicates monochrome, the processing proceeds to step S5311. At step S5305, before carrying out the drawing processing based on the designated tint block setting, the tint block setting is changed to monochrome (redesignated to the monochrome tint block color), followed by proceeding to step S5311. At step S5311, the printing processing is carried out in the monochrome mode using the designated tint block setting, followed by proceeding to step S708.

Here, the reason for changing the tint block setting designated as color to the monochrome tint block setting at step S5305 before executing the drawing processing will be described. Here, in accordance with the embodiment, the description is made under the assumption that the color image is represented by four colors of CMYK. Of course, it is obvious that the colors of the color representation are not limited to the combination of CMYK.

When converting the color image to the monochrome image, pure colors such as magenta and cyan are converted to gray (in which case, the black thickness is greater than 0% and less than 100%) rather than to black (pure black with thickness of 100%).

In addition, since the copy-forgery-inhibited pattern image includes a lot of isolated dots, if the isolated dot image represented by magenta, cyan and the like is subjected to the monochrome conversion, the isolated dots will become gray. If the gray isolated dots undergo binarization, the dots to be formed can be lost depending on their position and gray thickness.

The elimination of the isolated dots in the copy-forgery-inhibited pattern image can cause a problem of uneven thickness of the isolated dot (small dot) areas. The same problem can occur not only in the small dot areas, but also in large dot areas.

Thus, the conversion to the monochrome image after drawing the copy-forgery-inhibited pattern image designated as color can cause the uneven thickness of the small and large dot areas. This will change the thickness of the large and small dot areas of the copy-forgery-inhibited pattern image, and deprive the meaning of the copy-forgery-inhibited pattern image.

In addition, the colors CMYK have their own proper characteristics (such as color, toner thickness and output characteristics of the printer engine). Accordingly, only replacing the magenta, cyan dots by black dots is not enough to output the copy-forgery-inhibited pattern image with the best monochrome because the optimized copy-forgery-inhibited pattern image setting is not considered for each color in accordance with the proper characteristics of the colors.

Next, reason therefor will be explained in comparison with a watermark printing function which is conventionally known art.

A watermark printing function is a function to print a page in which a watermark rendering object such as "Confidential" is added to an original output image, like a tint block printing function. A color watermark can be specified in watermark printing, too. Further, there is a possible case in which a color of a watermark is specified while a printer driver carries out printing in monochrome.

It is important to reproduce a watermark object in a specified color in the case of watermark printing. In other words, when a predetermined color of the watermark object is specified while printing is carried out in a monochrome mode, the watermark object finally added to an original output image is controlled in a manner such that a predetermined color image is replaced with a monochrome image by the printer driver.

With referring to FIG. 7, a description will be briefly given of one example of color to monochrome change processing of a watermark object in carrying out monochrome printing when the color watermark object is specified.

As to the color watermark object, color information specified on a watermark printing specifying screenshot not shown is transformed as a RGB command. This RGB command is transferred from a despooler 305 to a graphic engine 202 to a dispatcher 301, then to the printer driver 203. The printer driver 203 receives color information and converts it to a gray scale value (black density is larger than 0% and less than 100%) which is optimal for monochrome printing of the color information by a target printer. For example, when color of the watermark is specified as red (R=255, G=0, B=0), the printer driver converts it to gray at a density of 50% based upon a predetermined calculation, so that the watermark object has a gray value of 50%.

Finally, this watermark object is transformed to a PDL command by the printer driver 203. This PDL command is outputted as a printer control command to a printer 1500 via a system spooler 204. This command is received by the printer 1500 and undergoes binarization which is separately specified to form an image on a printing medium.

The above case is shown by way of one example. There are some other cases. In one case, binarization is carried out in the printer driver 203 and then, the printer control command is transferred to the printer 1500. In another case, the printer control command is generated by the printer driver 203 while retaining color information. Then, in the printer 1500 which receives this printer control command, change from color to monochrome and binarization are carried out. In this manner, a color watermark object is printed as a monochrome watermark object.

In the meantime, in the case of tint block printing, in addition to specified color, reproducibility of large and small dots and uniformity of densities of a small dot area and a large dot area are important as set forth earlier. For this reason, even by mere change of a copy-forgery-inhibited pattern image from color to monochrome, or replacement with another color, a density and dots do not agree with those properly preset as a copy-forgery-inhibited pattern image in gray, making it impossible to obtain an optimal monochrome copy-forgery-inhibited pattern image.

In the case that in the printer driver 203, monochrome printing is instructed and a color tint block such as YMC etc. is set, information that the monochrome printing is set is inputted from the printer driver 203 to the tint block processing section 205 when printing is carried out. Upon receipt of this information, the tint block processing section 205 replaces a color tint block setting with a monochrome tint block setting. More specifically, a color of a copy-forgery-inhibited pattern image is specified as monochrome. Further, various settings are changed to those for a monochrome tint block. Here, various settings include density parameter values of a latent image stored according to the monochrome tint block and of a background portion.

Thereafter, based upon the replaced information, the tint block processing section 205 generates a monochrome copy-forgery-inhibited pattern image. Control is effected in a manner such that this monochrome copy-forgery-inhibited pattern image is printed after this monochrome copy-forgery-inhibited pattern image is transferred to the despooler 305 to the graphic engine 202 to the dispatcher 301 to the printer driver 203 to the system spooler 204, and then to the printer 1500 in this sequence. Binarization is executed in the printer 1500 or the printer driver 203. However, the copy-forgery-inhibited pattern image is a bit map expressed in binary representation of white (a black density of 0%) and black (a black density of 100%). Thus, the copy-forgery-inhibited pattern image is not influenced by binarization (pseudo gray scale processing), and is represented by a white pixel and a black pixel after the binarization, making it possible to maintain reproducibility of dots and uniformity of densities of a small dot area and a large dot area.

As discussed above, it is necessary to represent the individual dots in pure black toner (black ink) when the printing is performed after converting the copy-forgery-inhibited pattern image which is designated by colors such as magenta and cyan to monochrome. Thus, the processing is carried out of changing the setting for the copy-forgery-inhibited pattern image designated in color to the setting for outputting the monochrome copy-forgery-inhibited pattern image before the drawing processing. The processing makes it possible to produce a document on which an appropriate copy-forgeryinhibited pattern image is printed without involving useless output even when the copy-forgery-inhibited pattern image designated in color is automatically converted to the monochrome copy-forgery-inhibited pattern image.

Incidentally, it is obvious that when the setting items of the tint block contain a supplementary attribute associated with the color mode, the setting is also changed in connection with the foregoing change.

In addition, when the user selects the color output of the copy-forgery-inhibited pattern image while the printing in the monochrome mode is set, a step of notifying the user that the "copy-forgery-inhibited pattern image is printed in monochrome (gray)" can be added. It is also possible to further add to the step a step of inquiring of the user as to whether the color processing mode is to be changed or not.

Further, when printing is selectively effected between copy-forgery-inhibited pattern image printing and watermark printing, color change processing is carried out by the printer driver 203 in the case of the watermark printing. In the case of the copy-forgery-inhibited pattern image printing, it is possible to switch control such that the generated copy-forgery-inhibited pattern image is sent to the printer driver 203 after the tint block processing section 205 changes a color tint block setting to a monochrome tint block setting in order not to carry out color change processing in the printer driver 203.

Figure 21:
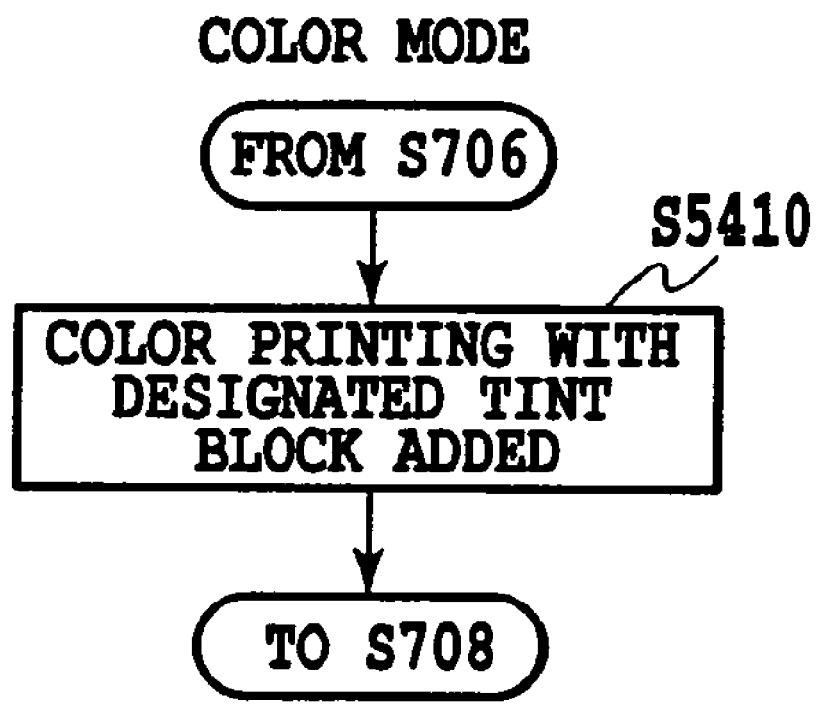
FIG. 21 is a flowchart illustrating an example of control of a manuscript and tint block color during the time when the color processing mode color is selected.

FIG. 21 shows the processing when the "full-color" is selected in the menu 5101 of color in FIG. 3. In this case, the color mode is started regardless of the color setting of the manuscript and tint block, thereby using the tint block setting of the color mode unconditionally. Thus, at step S5410, the printing is carried out in the color mode using the designated tint block setting, followed by proceeding to step S708.

Print-Data Generating Process of Copy-Forgery-Inhibited Pattern Image

Figure 22:
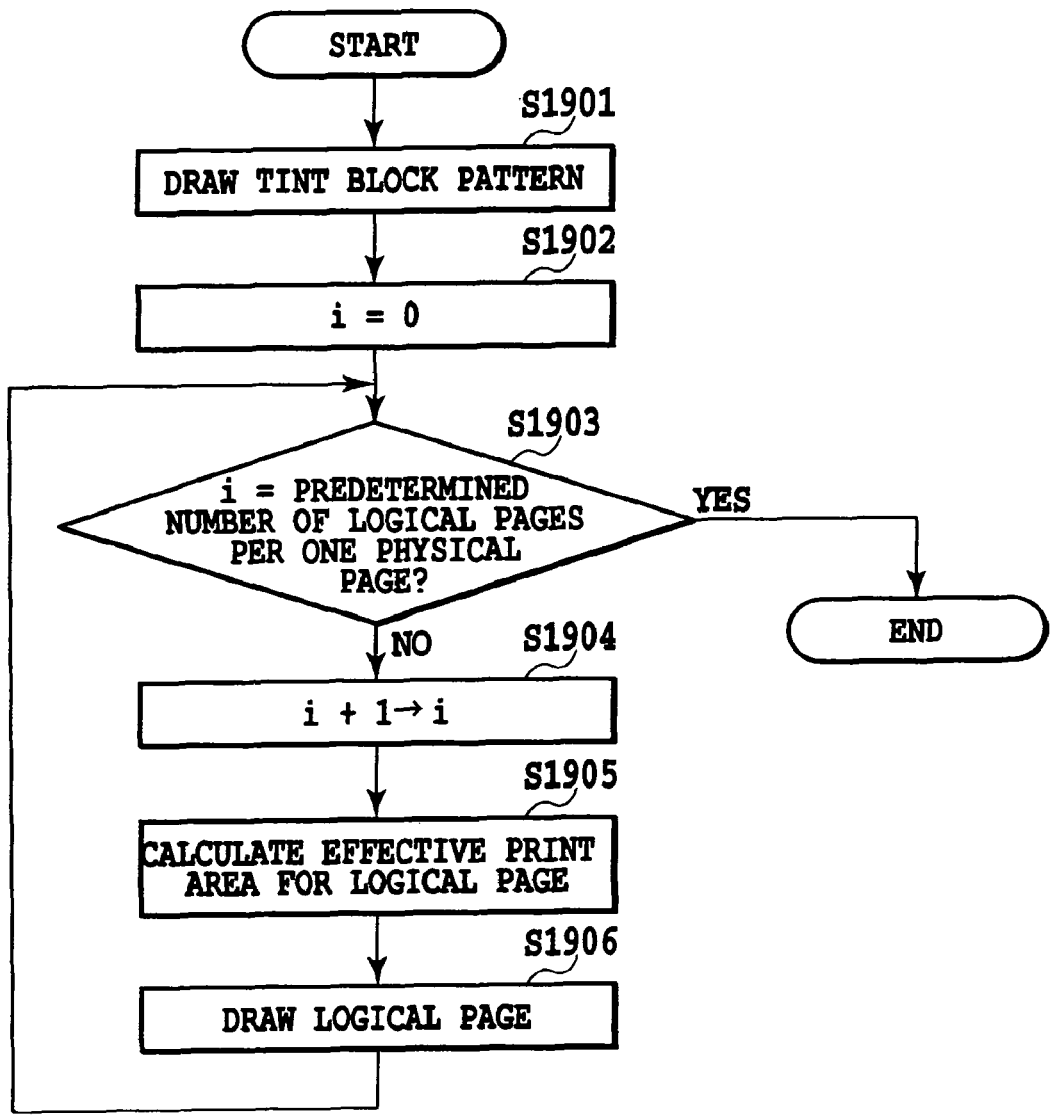
FIG. 22 is a flowchart showing one example of a drawing process of a tint block pattern.
Figure 23:
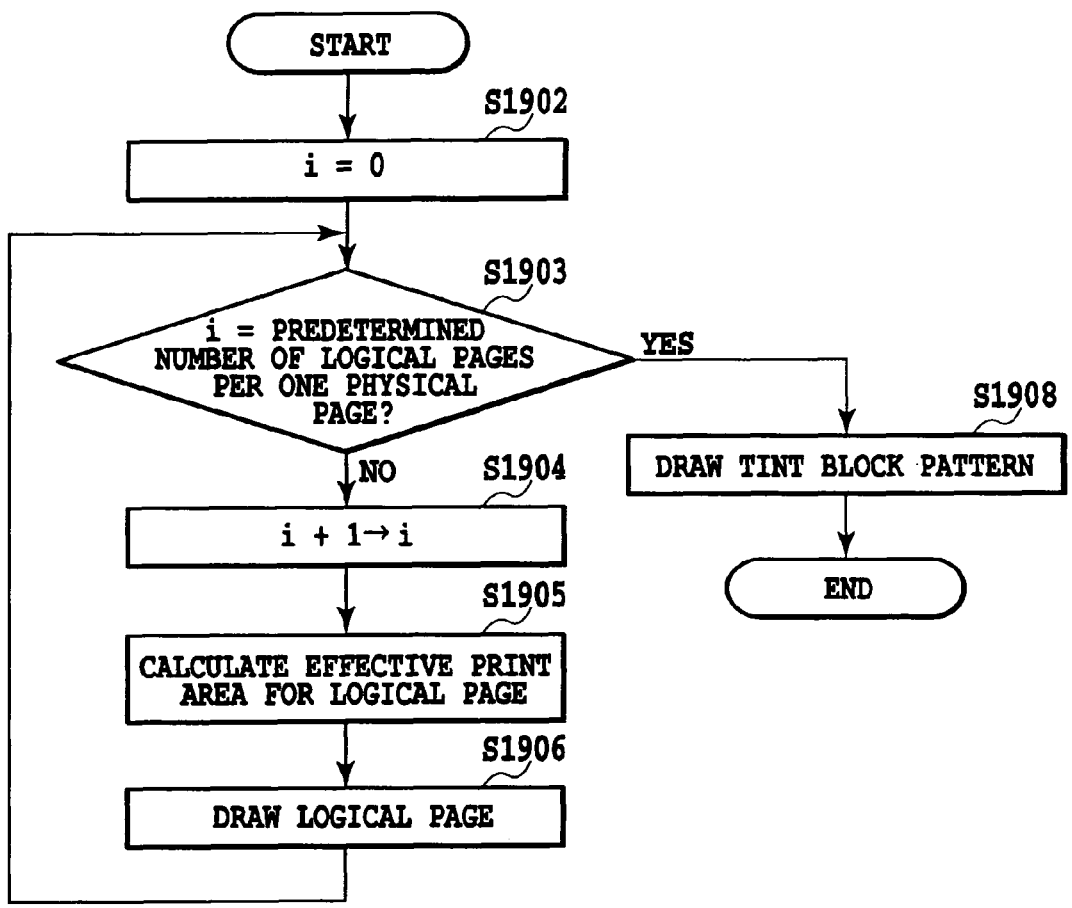
FIG. 23 is a flowchart showing one example of a drawing process of a tint block pattern.

FIG. 22 and FIG. 23 are flowcharts showing a flow of print-data generating process of the copy-forgery-inhibited pattern image in the tint block printing. These figures correspond to "watermark printing" and "superposition printing" explained in FIG. 17, respectively. These processes are performed in the course of the print processing in Step S708 of FIG. 10, i.e., in the print data generating process.

First, "watermark printing," i.e., a case where print data of the copy-forgery-inhibited pattern image is generated in advance will be described using the flowchart of FIG. 22. As described above, "watermark printing" is a process of rasterizing manuscript data over the copy-forgery-inhibited pattern image data in bit map memory of a printer. Therefore, the order of generation of print data is such that the print data of the copy-forgery-inhibited pattern image is generated prior to generation of the print data corresponding to the manuscript data.

In Step S1901, the tint block processing section 205 generates a copy-forgery-inhibited pattern image according to information on the tint block shown in FIG. 18. The detailed processing will be described later with reference to FIG. 24. Then, a print-data generating process of the manuscript data is performed. The counter is initialized in Step S1902. In Step S1903, it is determined whether the counter indicates the number of logical pages per physical page previously set. If it becomes equal to the number of logical pages, this processing is finished; if it is not equal, the flow proceeds to Step S1904. The counter is incremented by unity in Step S1904. In Step S1905, an effective print area for logical pages for which the print-data generating process will be preformed after this based on the number of logical pages per physical page and the counter. In Step S1906, the current logical page number is read using the counter as an index based on information on the physical page informed in the format as FIG. 13, and pertinent logical pages are reduced in size so as to fit into the effective print area. However, if the N-page printing is not specified, naturally there is no necessity for reduction.

Next, a case of "superposition printing," that is, a case where print data of the manuscript data is generated in advance will be described using the flowchart of FIG. 23. As described above, "superposition printing" is a process of rasterizing the copy-forgery-inhibited pattern image on the manuscript data in the bit map memory of the printer. Therefore, the order of generation of print data will be such that print data corresponding to the manuscript data is generated prior to generation of print data corresponding to the copy-forgery-inhibited pattern image.

The counter is initialized in Step S1902. Next, in Step S1903, it is determined whether the counter becomes the number of logical pages per physical page previously set. If it becomes equal to that number of logical pages, the flow proceeds to Step S1908; if it is not equal, the flow proceeds to Step S1904. The counter is incremented by unity in Step S1904. In Step S1905, an effective print area for logical pages that will be generated after this is calculated based on the number of logical pages per physical page and the counter. In Step S1906, the current logical page number is read using the counter as an index based on information about the physical page notified in the form as of FIG. 13, and pertinent logical pages are reduced in size so as to fit in the effective print area. However, if the N-page printing is not specified, naturally there is no necessity for reduction. When the print data corresponding to the predetermined number of logical pages as one physical page has been generated, the flow proceeds to Step S1908. In Step S1908, the tint block processing section 205 generates the copy-forgery-inhibited pattern image according to the information on the tint block shown in FIG. 18 based on the effective print area of the physical page acquired from the application. The detailed processing will be described later with reference to FIG. 24.

Figure 24:
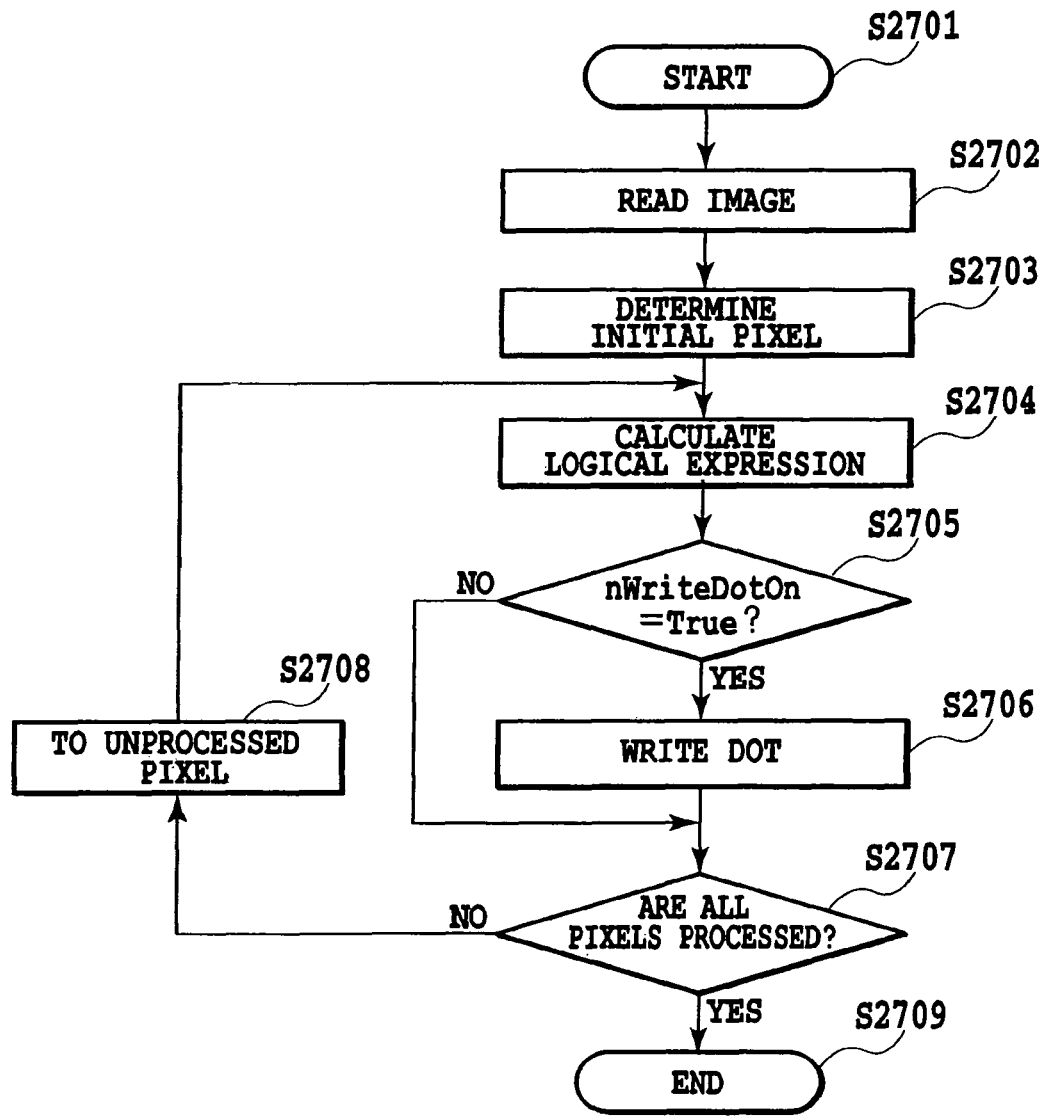
FIG. 24 is a flowchart showing one example of a drawing process of a tint block pattern.

FIG. 24 is a flowchart showing details of the copy-forgery-inhibited pattern image generating process in Step S1901 shown in FIG. 22 and of the copy-forgery-inhibited pattern image generating process in Step S1908 shown in FIG. 23, both according to the one embodiment of the present invention. Hereafter, the copy-forgery-inhibited pattern image generating process will be described with reference to FIG. 24.

First, the copy-forgery-inhibited pattern image generating process is started in Step S2701. To be concrete, a copy-forgery-inhibited pattern image generation direction and the above-mentioned tint block printing setting information are inputted to the tint block processing section 205. Next, the tint block processing section 205 reads a background threshold pattern, a foreground threshold pattern, a basic image, and a camouflage image in Step S2702. Here, the basic image is image data serving as a base for generating the copy-forgery-inhibited pattern image. This is an image generated by the despooler 305 based on various setting information shown in FIG. 18.

Further, the tint block processing section 205 determines an initial pixel in generating the copy-forgery-inhibited pattern image in Step S2703. For example, when the copy-forgery-inhibited pattern image is generated by performing image processing in order of raster scanning, from the upper left to the lower right, on the whole printable area of A4 paper, the upper left of the printable area is specified as an initial position. In this case, the printable area and the copy-forgery-inhibited pattern image area are equal.

Next, in Step S2704, the tint block processing section 205 performs processing to arrange the background threshold pattern, the foreground threshold pattern, the basic image, and the camouflage image in tiles on the copy-forgery-inhibited pattern image area, starting from the upper left of that area, by calculation based on the following expression (1). By this calculation, it is determined whether a pixel value corresponding to a dot at the time of printing is written in the said pixel position. At this time, the pixel value corresponds to color information entered. Here, the background threshold pattern and the foreground threshold pattern are image data consisting of "1" and "0" that correspond to writing/unwriting of a dot. These images are data binarized by respective dither matrices suitable for forming the foreground (latent) image and the background image, respectively.

$$n\text{WriteDotOn} = n\text{Camouflage} \times (n\text{SmallDotOn} \times \neg n\text{HiddenMark} + n\text{LargeDotOn} \times n\text{HiddenMark}) \quad (1)$$

The components of the expression are shown below.

nCamouflage: if an object pixel is a pixel that constitutes a camouflage pattern in a camouflage image, it assumes 0; if otherwise, 1.

nSmallDotOn: if the pixel value of the background threshold pattern is black, it assumes 1; if white, then 0 (color is not limited to this).

nLargeDotOn: if the pixel value of the foreground threshold pattern is black, it assumes 1; if white, then 0 (color is not limited to this).

nHiddenMark: if a target pixel in the basic image is a pixel that constitutes the latent image, it assumes 1; if a pixel that constitutes the background image, it assumes 0.

¬nHiddenMark: Negation of nHiddenMark. It assumes 0 in the foreground section; and 1 in the background section.

Incidentally, it is not necessary to calculate the expression (1) by using all compositions therein for each pixel to be processed. Omission of unnecessary calculation can enhance the speed of processing.

For example, if nHiddenMark=1, then ¬nHiddenMark=0, and if nHiddenmark=0, then ¬nHiddenMark=1. Therefore, it is good to assume a value of the following expression (2) as a value of nLargeDotOn if HiddenMark=1, and to assume a value of the expression (2) as a value of nSmallDotOn if nHiddenMark=0.

Moreover, since a value of nCamouflage is a multiplicand to the terms in a parenthesis as shown in the expression (1), if nCamouflage=0, then nWriteDotOn=0. Therefore, if nCamouflage=0, calculation of the expression (2) below can be omitted.

$$(n\text{SmallDotOn} \times \neg n\text{HiddenMark} + n\text{LargeDotOn} \times n\text{HiddenMark}) \quad (2)$$

Furthermore, an image whose dimensions of length and breadth are least common multiples of lengths and breadths of the background threshold pattern, the foreground threshold pattern, the basic image, and the camouflage image, respectively. Therefore, the processing time for generating the copy-forgery-inhibited pattern image can be shortened if the tint block processing section 205 generates only one portion of the copy-forgery-inhibited pattern image that is the minimum unit of repetition and arranges that portion of the copy-forgery-inhibited pattern image repeatedly to tile the copy-forgery-inhibited pattern image area completely.

Next, in Step S2705, the CPU 1 determines the calculation result (a value of nWriteDotOn) in Step S2704. That is, if nWriteDotOn=1, the flow proceeds to Step S2706; if nWriteDotOn=0, the flow proceeds to Step S2707.

In Step S2706, a process of writing a pixel value corresponding to a dot at the time of printing is performed. Here, the pixel value is changeable according to a color of the copy-forgery-inhibited pattern image. In addition, a color copy-forgery-inhibited pattern image can be formed by setting the pixel values in conformity with colors of printer toners or inks. Moreover, secondary colors generated by combining a plurality of colors of the toners or inks.

It is determined whether all pixels in the area to be processed were processed in Step S2707. If all the pixels in the area to be processed are not processed, the flow proceeds to Step S2708, where unprocessed pixels are selected and processing in Steps S2704-S2706 is performed again.

According to this embodiment, the user is allowed to select either watermark printing or superposition printing according to a blank area of the manuscript data, presence/absence of an area to be painted with a white image, the application having generated the manuscript data, etc. Therefore, the present invention makes the information processing apparatus easy to use for the user in terms of tint block printing.

Incidentally, a process of synthesizing a bit map image from the copy-forgery-inhibited pattern image data and the manuscript image data is performed in the printer 1500. In the synthetic processing in the printer, if the superposition printing is set up, first the manuscript image data is rasterized onto bit map memory, and then the copy-forgery-inhibited pattern image data is rasterized in such a way as to be written over the manuscript image data. At this time, if the copy-forgery-inhibited pattern image data were simply written over it, the manuscript image would disappear. Then, in the case where the superposition printing is set up, the manuscript data is prevented from being overwritten with the copy-forgery-inhibited pattern image by using logical drawing of AND/OR. For example, the following processing is performed: if a pixel of the bit map image obtained by spreading the manuscript image data has a value corresponding to white, the copy-forgery-inhibited pattern image data corresponding to the pixel is written over the bit map memory corresponding to the said pixel position; and if a pixel has a value corresponding to non-white, the copy-forgery-inhibited pattern image data corresponding to the pixel is not written over it.

(Other Embodiments)

The present invention may be applied to a system comprising two or more pieces of equipment (for example, host computer, interface device, reader, printer, etc.), and to equipment consisting of a single device (copying machine, printer, facsimile apparatus, etc.).

In addition, the object of the present invention is also achieved by allowing a computer in a system or equipment (or CPU, or MPU) to read and execute program code stored in a storage medium for storing program code that executes procedures of the flowcharts realizing the above-mentioned functions of the embodiment and being shown in the figures.

In this case, the program code itself read from the storage medium will realize the above-mentioned functions of the embodiments, and consequently the storage medium storing the program code constitutes the present invention.

As storage media for providing the program code, there can be used, for example, a floppy disk, a hard disk, an optical disk, a magneto-optical disk, CD-ROM, CD-R, magnetic tape, a nonvolatile memory card, ROM, etc.

Moreover, the present invention includes not only a case where the above-mentioned functions of the embodiments are realized by a computer executing read program code, but also a case where the OS (Operating System) working on a computer executes a part or the whole of actual processing based on instructions of the program code, by which processing the above-mentioned functions of the embodiments are realized.

Furthermore, the present invention also includes a case where the program code read from the storage medium is written into memory possessed by a function expansion board loaded into a computer or by a function expansion section connected to a computer, and subsequently, based on instructions of the program code, a CPU possessed by the function expansion board or by the function expansion section or etc. executes a part or the whole of actual processing, by which processing the above-mentioned functions of the embodiment are realized.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

This application claims priority from Japanese Patent Application Nos. 2003-411060 filed Dec. 9, 2003 and 2004-322750 filed Nov. 5, 2004, which are hereby incorporated by reference herein.

What is claimed is:

1. A printing control apparatus comprising:
   a receiving unit configured to receive a selection of an automatic switching mode or a monochrome mode in a selection of printing modes from a user;
   a manuscript color determining unit configured to determine whether a manuscript is color or monochrome;
   a copy-forgery-inhibited pattern image color determining unit configured to determine whether color setting of a copy-forgery-inhibited pattern image is color or monochrome; and
   a controlling unit configured to control printing such that:
   in the case where the selection of the automatic switching mode is received,
   only if the manuscript is determined as a monochrome page and the color setting of the copy-forgery-inhibited pattern image is determined as monochrome, a synthesized result of the manuscript and the copy-forgery-inhibited pattern image is printed in monochrome, and if not, the synthesized result of the manuscript and the copy-forgery-inhibited pattern image is printed in color, and
   in the case where the selection of the monochrome mode is received,
   if the color setting of the copy-forgery-inhibited patter image is determined as monochrome, the synthesized result of the manuscript and the copy-forgery-inhibited pattern image is printed in monochrome, and if the color setting of the copy-forgery-inhibited pattern image is determined as color, whether the printing mode is to be changed or not is inquired.

2. A printing control apparatus comprising:
   a receiving unit configured to receive a selection of an automatic switching mode or a monochrome mode in a selection of printing modes from a user;
   a manuscript color determining unit configured to determine whether a manuscript is color or monochrome;
   a copy-forgery-inhibited pattern image color determining unit configured to determine whether color setting of a copy-forgery-inhibited pattern image is color or monochrome; and
   a controlling unit configured to control printing such that:
   in the case where the selection of the automatic switching mode is received,
   only if the manuscript is determined as a monochrome page and the color setting of the copy-forgery-inhibited pattern image is determined as monochrome, a synthesized result of the manuscript and the copy-forgery-inhibited pattern image is printed in monochrome, and if not, the synthesized result of the manuscript and the copy-forgery-inhibited pattern image is printed in the color mode, and
   in the case where the selection of the monochrome mode is received,
   if the color setting of the copy-forgery-inhibited patter image is determined as monochrome, the synthesized result of the manuscript and the copy-forgery-inhibited pattern image is printed in monochrome, and if the color setting of the copy-forgery-inhibited pattern image is determined as color, the user is notified that the copy-forgery-inhibited pattern image is printed in monochrome.

3. The printing control apparatus according to claim 1 or 2, wherein the receiving unit is capable of further receiving a selection of the color mode, and
   wherein the controlling unit is configured to control printing such that the synthesized result of the manuscript and the copy-forgery-inhibited pattern image is printed in color regardless of the color of the manuscript and the color setting of the copy-forgery-inhibited pattern image if the selection of the color mode is received.

4. The printing control apparatus according to claim 1 or 2, wherein in a printed material obtained by printing the copy-forgery-inhibited pattern image, dot masses are arranged in a first area and dots are arranged dispersedly in a second area which is different from the first area, wherein a difference in density between the first and second areas in a duplicate obtained by copying the printed material is greater than a difference in density between the first and second areas in the printed material, the apparatus previously storing density parameters for generating the copy-forgery-inhibited pattern image in the case where the color setting is monochrome, and
   wherein if the selection of the monochrome mode is received by the receiving unit and the color setting of the copy-forgery-inhibited pattern image is determined as color, the controlling unit is configured to set the density parameters to density parameters for generating the copy-forgery-inhibited color image in the case where the previously stored color setting is monochrome and generate a monochrome copy-forgery-inhibited pattern image using the set density parameters.

5. A method in a printing control apparatus, comprising:
   receiving a selection of an automatic switching mode or a monochrome mode in a selection of printing modes from a user;
   determining whether a manuscript is color or monochrome;
   determining whether color setting of a copy-forgery-inhibited pattern image is color or monochrome; and
   controlling printing such that:
   in the case where the selection of the automatic switching mode is received,
   only if the manuscript is determined as a monochrome page and the color setting of the copy-forgery-inhibited pattern image is determined as monochrome, a synthesized result of the manuscript and the copy-forgery-inhibited pattern image is printed in monochrome, and if not, the synthesized result of the manuscript and the copy-forgery-inhibited pattern image is printed in color, and
   in the case where the selection of the monochrome mode is received, if the color setting of the copy-forgery-inhibited patter image is determined as monochrome, the synthesized result of the manuscript and the copy-forgery-inhibited pattern image is printed in monochrome, and if the color setting of the copy-forgery-inhibited pattern image is determined as color, whether the printing mode is to be changed or not is inquired.

6. A method in a printing control apparatus, comprising:
receiving a selection of an automatic switching mode or a monochrome mode in a selection of printing modes from a user;
determining whether a manuscript is color or monochrome;
determining whether color setting of a copy-forgery-inhibited pattern image is color or monochrome; and
controlling printing such that:
in the case where the selection of the automatic switching mode is received,
only if the manuscript is determined as a monochrome page and the color setting of the copy-forgery-inhibited pattern image is determined as monochrome, a synthesized result of the manuscript and the copy-forgery-inhibited pattern image is printed in monochrome, and if not, the synthesized result of the manuscript and the copy-forgery-inhibited pattern image is printed in the color mode, and
in the case where the selection of the monochrome mode is received,
if the color setting of the copy-forgery-inhibited patter image is determined as monochrome, the synthesized result of the manuscript and the copy-forgery-inhibited pattern image is printed in monochrome, and if the color setting of the copy-forgery-inhibited pattern image is determined as color, the user is notified that the copy-forgery-inhibited pattern image is printed in monochrome.

7. The method according to claim 5 or 6, wherein a selection of the color mode can be further received, and
wherein printing is controlled such that the synthesized result of the manuscript and the copy-forgery-inhibited pattern image is printed in color regardless of the color of the manuscript and the color setting of the copy-forgery-inhibited pattern image if the selection of the color mode is received.

8. The method according to claim 5 or 6, wherein in a printed material obtained by printing the copy-forgery-inhibited pattern image, dot masses are arranged in a first area and dots are arranged dispersedly in a second area which is different from the first area, wherein a difference in density between the first and second areas in a duplicate obtained by copying the printed material is greater than a difference in density between the first and second areas in the printed material, the apparatus previously storing density parameters for generating the copy-forgery-inhibited pattern image in the case where the color setting is monochrome, and
wherein if the selection of the monochrome mode is received and the color setting of the copy-forgery-inhibited pattern image is determined as color, the controlling sets the density parameters to density parameters for generating the copy-forgery-inhibited color image in the case where the previously stored color setting is monochrome and generates a monochrome copy-forgery-inhibited pattern image using the set density parameters.

9. A non-transitory computer-readable medium having stored thereon program code which allows a printing control apparatus to implement the method according to claim 5 or 6.

10. A printing control apparatus comprising:
a receiving unit configured to receive a selection of an automatic switching mode or a monochrome mode in a selection of printing modes from a user;
a manuscript color determining unit configured to determine whether a manuscript is color or monochrome;
a copy-forgery-inhibited pattern image color determining unit configured to determine whether color setting of a copy-forgery-inhibited pattern image is color or monochrome; and
a controlling unit configured to control printing such that:
in the case where the selection of the automatic switching mode is received, only if the manuscript is determined as a monochrome page and the color setting of the copy-forgery-inhibited pattern image is determined as monochrome, a synthesized result of the manuscript and the copy-forgery-inhibited pattern image is printed in monochrome, and
if the manuscript is determined as a monochrome page and the color setting of the copy-forgery-inhibited pattern image is determined as color, or if the manuscript is determined as a color page and the color setting of the copy-forgery-inhibited pattern image is determined as monochrome, or if the manuscript is determined as a color page and the color setting of the copy-forgery-inhibited pattern image is determined as color, the synthesized result of the manuscript and the copy-forgery-inhibited pattern image is printed in color, and
in the case where the selection of the monochrome mode is received, if the color setting of the copy-forgery-inhibited patter image is determined as monochrome, the synthesized result of the manuscript and the copy-forgery-inhibited pattern image is printed in monochrome, and
if the color setting of the copy-forgery-inhibited pattern image is determined as color, whether the printing mode is to be changed or not is inquired.

* * * * *